(12) United States Patent
Lindqvist et al.

(10) Patent No.: US 8,885,500 B2
(45) Date of Patent: Nov. 11, 2014

(54) INTERFACE SETUP FOR COMMUNICATIONS NETWORK WITH FEMTOCELLS

(75) Inventors: Thomas Lindqvist, Mölndal (SE); Tomas Nylander, Värmdö (SE); Jari Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 426 days.

(21) Appl. No.: 13/133,804

(22) PCT Filed: Dec. 10, 2008

(86) PCT No.: PCT/SE2008/051429
§ 371 (c)(1),
(2), (4) Date: Jun. 9, 2011

(87) PCT Pub. No.: WO2010/068154
PCT Pub. Date: Jun. 17, 2010

(65) Prior Publication Data
US 2011/0243097 A1    Oct. 6, 2011

(51) Int. Cl.
*H04L 12/28* (2006.01)
*H04W 24/02* (2009.01)
*H04W 36/04* (2009.01)
*H04W 84/04* (2009.01)

(52) U.S. Cl.
CPC .............. *H04W 24/02* (2013.01); *H04W 36/04* (2013.01); *H04W 84/045* (2013.01)
USPC ......................................... 370/252; 370/401

(58) Field of Classification Search
USPC .............. 370/252, 254, 328, 338, 395.2, 400, 370/401; 455/403, 436, 439, 442, 444, 450
See application file for complete search history.

(56) References Cited

U.S. PATENT DOCUMENTS

2005/0148368 A1   7/2005  Scheinert et al.
2007/0254620 A1*  11/2007 Lindqvist et al. ............. 455/403

OTHER PUBLICATIONS

3rd Generation Partnership Project. 3GPP TS 36.453, V8.4.0 (Dec. 2008), 3rd Generation Partnership Project; Technical Specification Group Radio Access Network; Evolved Universal Terrestrial Radio Access Network (E-UTRAN); X2 application protocol (X2AP) (Release 8), Dec. 2008.
3rd Generation Partnership Project. "Impact on S1AP from HeNB GW Concept." 3GPP TSG RAN WG3 Meeting #59, R3-080465, Sorrento, Italy, Feb. 11-15, 2008.
3rd Generation Partnership Project. R3-083410, 3GPP TR R3.020, V0.9.1 (Nov. 2008) 3rd Generation Partnership Project; Technical Specification Group Radio Access Network; Home (e)NodeB; Network aspects (Release 8), Nov. 2008.

(Continued)

*Primary Examiner* — Kevin C Harper
*Assistant Examiner* — Mon Cheri Davenport
(74) *Attorney, Agent, or Firm* — Coats & Bennett, PLLC

(57) ABSTRACT

A method of operating a communications network comprises determining that an interface needs to be established between a femto radio base station gateway (40) and a macro radio base station (28), and when establishing the interface between the macro radio base station (28) and the femto radio base station gateway (40), including abbreviated femtocell information in a message of an interface setup procedure sent between the femto radio base station gateway (40) and the macro radio base station (28).

27 Claims, 16 Drawing Sheets

(56) References Cited

OTHER PUBLICATIONS

3rd Generation Partnership Project. "ANR Neighbors IP Address Lookup and Establishment." 3GPP TSG-RAN WG3 Meeting #60, R3-081226, Kansas City, Missouri, US, May 5-9, 2008.

3rd Generation Partnership Project. "On Automatic Neighbour Relation Configuration." 3GPP TSG RAN WG3 Meeting #57bis, R3-071819, Sophia Antipolis, France, Oct. 8-11, 2007.

Mitsubishi Electric, "EUTRAN Proxy in support of massive deployment of HNBs", 3GPP TSG RAN WG3 Meeting #59, Feb. 11-15, 2008, Sorrento, Italy, R3-080062.

\* cited by examiner

INTERFACE SETUP FOR COMMUNICATIONS NETWORK WITH FEMTOCELLS

BACKGROUND

This invention pertains to telecommunications, and particularly to establishing an interface in a telecommunications network that includes relative small cells known as femtocells.

In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones ("cellular" telephones) and laptops with wireless capability, e.g., mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area or group of cell areas being served by a base station, a radio base station (RBS), which in some networks is also called "NodeB" or "Node B". A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs). The Third Generation Partnership Project (3GPP) has undertaken to evolve further the UTRAN and GSM based radio access network technologies.

Specifications for the Evolved Universal Terrestrial Radio Access Network (E-UTRAN) are ongoing within the $3^{rd}$ Generation Partnership Project (3GPP). Another name used for E-UTRAN is the Long Term Evolution (LTE) Radio Access Network (RAN).

Long Term Evolution (LTE) is a variant of a 3GPP radio access technology wherein the radio base stations are connected directly to a core network rather than to radio network controller (RNC) nodes. In general, in LTE the functions of a radio network controller (RNC) node are performed by the radio base stations nodes. As such, the radio access network (RAN) of an LTE system has an essentially "flat" architecture comprising radio base stations without reporting to radio network controller (RNC) nodes.

The evolved UTRAN (E-UTRAN) comprises evolved base stations, e.g., evolved NodeBs or eNodeBs or eNBs, providing evolved UTRA user-plane and control-plane protocol terminations toward the wireless terminal. The eNB hosts the following functions (among other functions not listed): (1) functions for radio resource management (e.g., radio bearer control, radio admission control), connection mobility control, dynamic resource allocation (scheduling); (2) selection of a mobility management entity (MME) when no routing to an MME can be determined from the information provided by the user equipment unit (UE); and (3) User Plane functions, including IP Header Compression and encryption of user data streams; termination of U-plane packets for paging reasons, and switching of U-plane for support of UE mobility. The eNB hosts the PHYsical (PHY), Medium Access Control (MAC), Radio Link Control (RLC), and Packet Data Control Protocol (PDCP) layers. The latter includes the functionality of user-plane header-compression and encryption. The eNodeB also offers Radio Resource Control (RRC) functionality corresponding to the control plane. The eNodeB performs many functions including radio resource management, admission control, scheduling, enforcement of negotiated UL QoS, cell information broadcast, ciphering/deciphering of user and control plane data, and compression/decompression of DL/UL user plane packet headers.

The core network where E-UTRAN is connected to is called the Evolved Packet Core (EPC), a.k.a. System Architecture Evolution (SAE) network. Both the E-UTRAN and the EPC comprise together the Evolved Packet System (EPS) that is also known as the SAE/LTE network. As indicated above, a base station in this concept is called eNodeB or eNB (E-UTRAN NodeB).

The specifications/studies for Long Term Evolution (LTE) and System Architecture Evolution (SAE) also include the possibility of having an E-UTRAN base station to provide home or small area coverage for a limited number of users. Such a home or small area coverage base station is herein also called HeNB (Home eNodeB). For UTRAN (WCDMA), this type of home access point is called HNB (Home NodeB).

The HeNB can provide normal radio services for the end users in home or small area coverage and can be connected to the mobile core network using, e.g., some kind of IP based transmission. As used herein, the radio coverage provided by the HeNB is called a "femtocell".

An example impetus for providing femtocell-type of local access is to provide cheaper call or transaction rates/charges for a wireless terminal when connected via the HeNB as compared to when the wireless terminal is connected via the eNB. Another impetus is reducing the load on the operator's eNBs and backhaul connections, thereby reducing the operator's capital expenditures and operating expenditures.

The HeNB can, in most cases, use the end user's already existing broadband connection (e.g. xDSL, Cable) to achieve connectivity to the operators mobile core network and possibly to other eNBs/HeNBs. Over the broadband connection and other possible intermediate IP networks (e.g. in the internet) a HeNB communicates with the core network nodes in the operator's network via an IPsec tunnel (Internet Protocol security architecture according to RFC 4301), which is established between the HeNB and a Security Gateway (SEGW), which protects the border of the operator's network.

FIG. 1 shows an exemplary LTE/SAE network with both femtocells and macrocells. FIG. 1 shows also a HeNB concentrator node (another name used for the HeNB concentrator node is HeNB-GW (HeNB Gateway). Although not shown in FIG. 1, in at least some configurations a Security Gateway (SEGW) can be logically placed between the HeNB and the HeNB-GW and can serve for terminating IPsec tunnels from the HeNB. FIG. 1 also shows the LTE radio access network (RAN) interfaces S1 (to the core network (CN)). and X2

(between eNBs/HeNBs). For simplicity, in FIG. 1 interface X2 is only shown between eNBs.

FIG. 2 shows the nodes and the interfaces in LTE radio access network (RAN) in more detail. In FIG. 2 it is assumed that at least the control plane of the X2 interface (X2-CP) to/from a HeNB passes the HeNB Concentrator Node (also named for example the HeNB Gateway (HeNB-GW)).

The X2 interface between eNBs is mainly used for one kind of handover, often called 'X2-initiated handover'. When interface X2 is set up between two eNBs, a list of information on the cells served by an eNB is sent to the other eNB, and vice versa. Interface X2 is set up only between eNBs that serve cells between which handover may be performed. The protocol that is used on the X2 interface, i.e. the X2 Application Protocol (X2AP), includes various messages, including two messages known as the "X2 SETUP REQUEST" message and the "X2 SETUP RESPONSE" message. These two messages are defined to accommodate a maximum 256 served cells per eNB. The X2AP protocol also includes an "ENB CONFIGURATION UPDATE" message, which serves to update the served cell information. The maximum number of served cells per eNB for the "ENB CONFIGURATION UPDATE" message is also limited to 256.

Referring to FIG. 2, in the conventional practice of setting up the X2 interface between eNB_1 and eNB_2, information on the macrocells MC_1.1 to MC_1.$m$ is sent from eNB_1 to eNB_2 and information on the macrocells MC_2.1 to MC_2.$m$ is sent from eNB_2 to eNB_1. As indicated above, the maximum number of served cells has to be equal to or less than 256 for eNBs.

Yet a mobile network may have several hundreds of thousands (e.g., on the order of about 1 million) of HeNBs. It would be unreasonable to expect that the core network control nodes, e.g., Mobility Management Entities (MMEs) with their control part of S1s (S1-MMEs), would be able to handle so many HeNBs. Therefore, one purpose of the HeNB-GW (see FIG. 2) is to conceal the large number of HeNBs from the core network (CN). The HeNB-GW will, from the viewpoint of the core network CN (S1 interface), look like one eNB with many cells (even though cells are not really visible in the core network). The HeNB-GW will act as an eNB proxy for all the HeNBs that are connected to the HeNB-GW. From the viewpoint of a HeNB, the HeNB-GW will look like the core network (and also like the S1 interface). Similar reasoning is valid for the control part of the X2 interface (X2-CP); the HeNB-GW will look like one eNB with many cells from another eNB.

The number of HeNBs connected to a HeNB-GW is likely to be up to several tens of thousands (e.g., on the order of one hundred thousand) as the number of HeNB-GWs in a full network (e.g., on the order of one million HeNBs) should not exceed a few tens (e.g., on the order of ten). Thus the number of femtocells "served" by a HeNB-GW (an eNB proxy) may be up to a few hundreds of thousands (e.g., on the order of two hundred thousand), assuming a HeNB serves a few (e.g., two or so) femtocells. The HeNB-GW will maintain the list of the femtocells it is "serving" and the information per cell required for the X2 interface setup. This list is updated each time a HeNB is connected to or disconnected from the HeNB-GW.

The number of HeNBs and thus femtocells "below" a HeNB-GW may be very large (several tens of thousands). This means that the list of cell information from a HeNB-GW to an eNB at the setup of the X2 interface may contain very many cells. The number of cells supported by the present standardized signaling over the X2 interface is limited to 256.

Referring to FIG. 2 and the conventional proposal, when setting up the X2 interface between eNB_1 and HeNB-GW_3, information on the macrocells MC_1.1 to MC_1.$m$ (where m is likely to be less than 10 but certainly less than 256) is sent from eNB_1 to HeNB-GW_3 and information on the femtocells FC_31.1 to FC_39.$n$ is sent from HeNB-GW_3 to eNB_1. FIG. 2 shows the general case with several femtocells served by a HeNB (cells FC_31.1 to FC_31.$n$ is served by HeNB_31). In a normal scenario it is likely that a HeNB will serve only one cell (n would be equal to 1). As the number of femtocells "served" by a HeNB-GW may be much larger than 256 (several tens of thousands), the standardized procedures for the X2 interface are not feasible. Even if the maximum number of served cells in the used X2AP messages is increased from 256 in order to cope with the large number of served cells, it will not be feasible for an eNB to receive and store information on several tens of thousands of neighbor femtocells.

Besides, the number of femtocells may not be stable. The HeNBs for the femtocells are typically located at the end-users' premises beyond control of the operator. An end-user may disconnect and then re-connect the HeNB whenever the end-user so desires. This means that the list of cell information may be updated frequently and thus causing excessive signaling load in the neighbor eNBs.

A way to cope with the problem of the large number of HeNB-GW "served cells" in the X2 interface is not to use 'X2 initiated handover' but instead 'S1 initiated handover'. For the latter, the X2 interface control plane (X2-CP) is not needed. Rather, the signaling between eNBs needed for handover is accomplished in the S1 control plane (S1-MME) via a control node in core network, e.g., an MME. The current assumption in 3GPP is that this type handover shall be used for handovers involving a HeNB. However, this may cause severe signaling and processing load in the MMEs.

SUMMARY

In one of its aspects, the technology disclosed herein concerns a method of operating a radio access network. The method comprises determining that a control plane interface needs to be established between a femto radio base station gateway and a macro radio base station, and when establishing the interface between the macro radio base station and the femto radio base station gateway, including abbreviated femtocell information in a message of an interface setup procedure sent between the femto radio base station gateway and the macro radio base station.

In some example embodiment(s) or mode(s) of the method, the abbreviated femtocell information specifies that the femto radio base station gateway serves a femtocell without identifying any particular femtocell.

In other example embodiment(s) or mode(s) of the method, the abbreviated femtocell information specifies identities of femtocells which are served by the femto radio base station gateway and which also neighbor a macrocell served by the macro radio base station without identifying any other femtocells.

The act of determining that a control plane interface needs to be established between the femto radio base station gateway and the macro radio base station can comprise any one of the following: (1) establishing an interface between the femto radio base station and the femto radio base station gateway; (2) the macro radio base station attempting a handover for a user equipment unit connected in a macrocell served by the macro radio base station to a femtocell served by the femto radio base station; or (3) the femto radio base station attempting a handover for a user equipment unit connected in a femtocell served by the femto radio base station to a macrocell served by the macro radio base station.

In one example implementation, the method further comprises, upon start up of a femto radio base station, sending, via a management interface, a macrocell surrounding report to the femto radio base station gateway from the femto radio base station; and then establishing a control plane interface between the femto radio base station and the femto radio base station gateway.

In one example implementation, the method further comprises establishing a control plane interface between a femto radio base station and the femto radio base station gateway. Establishing the interface between a femto radio base station and the femto radio base station gateway can comprise the following acts: (1) the femto radio base station obtaining an address of the femto radio base station gateway; (2) establishing a connection between the femto radio base station and the femto radio base station gateway; (3) the femto radio base station sending information concerning the femtocells served by the femto radio base station to the femto radio base station gateway (info includes: Physical Cell Identity, PCI, E-UTRAN Cell Global Identity, ECGI, and E-UTRAN Node B Identity, eNB-ID); (4) the femto radio base station gateway storing the information concerning the femtocells served by the femto radio base station; and, (5) the femto radio base station gateway providing the femto radio base station with information regarding the known neighbor macrocells which were identified by the femto radio base station in a macrocell surrounding report via a management interface.

In an example implementation, the act of establishing the control plane interface between the femto radio base station gateway and the macro radio base station occurs, e.g., in the context of commissioning of a femto radio base station and further comprises: (1) the femto radio base station gateway retrieving an address of a macro radio base station whose served macrocell is included in a macrocell surrounding report obtained from a femto radio base station via a management interface; (2) establishing a connection between the femto radio base station gateway and the macro radio base station; (3) the femto radio base station gateway including the abbreviated femtocell information in an interface setup request message sent to the macro radio base station; (4) the macro radio base station storing the abbreviated femtocell information; (5) the macro radio base station including information about the macrocells served by the macro radio base station in an interface setup response message sent to the femto radio base station gateway; and, (6) the femto radio base station gateway storing information about the macrocells served by the macro radio base station.

In another example implementation, the method the act of establishing the control plane interface between the femto radio base station gateway and the macro radio base station occurs in the context of an attempted handover from a macrocell to a femtocell and further comprises: (1) the macro radio base station obtaining an identifier (Physical Cell Identity, PCI) of a handover candidate femtocell from a user equipment unit in a macrocell served by the macro radio base station; (2) the macro radio base station obtaining the E-UTRAN Cell Global Identity (ECGI) of the handover candidate femtocell from the user equipment unit; (3) the macro radio base station obtaining from the ECGI an identifier of the femto radio base station gateway for the handover candidate femtocell; (4) the macro radio base station obtaining an address of the femto radio base station gateway; (5) establishing a connection between the macro radio base station and the femto radio base station gateway; (6) the macro radio base station sending information on the macrocells served by the macro radio base station to the femto radio base station gateway in a message of an interface setup procedure; (7) the femto radio base station gateway storing the information on the macrocells served by the macro radio base station; (8) the femto radio base station gateway notifying its served femto radio base station that the femto radio base station gateway now serves as a proxy for the macrocells served by the macro radio base station if the any of the macrocells is included in the macrocell surrounding report generated by the femto radio base station; and (9) the femto radio base station gateway providing the abbreviated femtocell information to the macro radio base station.

In another example implementation, the method the act of establishing the control plane interface between the femto radio base station gateway and the macro radio base station occurs in the context of an attempted handover from a femtocell to a macrocell and further comprises: (1) a femto radio base station obtaining an identifier (Physical Cell Identity, PCI) of a handover candidate macrocell from a user equipment unit in a femtocell served by the femto radio base station; (2) the femto radio base station obtaining the E-UTRAN Cell Global Identity (ECGI) of the handover candidate macrocell from the user equipment unit; (3) the femto radio base station attempting a handover to the macrocell by sending a handover request message, including the ECGI of the handover candidate macrocell, to the femto radio base station gateway which serves the femto radio base station; (4) the femto radio base station gateway obtaining from the ECGI an identifier of the macro radio base station which serves the handover candidate macrocell; (5) the femto radio base station gateway obtaining an address for the macro radio base station which serves the handover candidate macrocell; (6) the femto radio base station gateway establishing a connection between the femto radio base station gateway and the macro radio base station which serves the handover candidate macrocell; (7) the femto radio base station gateway providing the abbreviated femtocell information to the macro radio base station which serves the handover candidate macrocell; (8) the macro radio base station which serves the handover candidate macrocell providing to the femto radio base station gateway information concerning its served macrocells; and (9) the femto radio base station gateway notifying its served femto radio base station that the femto radio base station gateway is a proxy for the macrocells served by the macro radio base station if the any of the macrocells is included in the macrocell surrounding report generated by the femto radio base station.

In another of its aspects, the technology disclosed herein concerns a femto radio base station gateway. The femto radio base station gateway comprises: (1) a memory configured to provide a directory of femto radio base stations served by the femto radio base station gateway and of femtocells served by the femto radio base stations; and (2) an interface manager. The interface manager is configured to establish an interface between the a femto radio base station gateway and a macro radio base station using an interface setup procedure, and wherein the interface manager is configured, when establishing the interface between the macro radio base station and the femto radio base station gateway, to include abbreviated femtocell information in a message of the interface setup procedure sent between the femto radio base station gateway and the macro radio base station.

In another of its aspects, the technology disclosed herein concerns a telecommunications system. The telecommunications system comprises: (1) a macro radio base station configured to serve at least one macrocell of a radio access network; (2) a femto radio base station configured to serve at least one femtocell of the radio access network; and (3) a femto radio base station gateway which serves the femto radio base station. The femto radio base station gateway comprises an interface manager which is configured to establish an interface between the femto radio base station gateway and the macro radio base station using an interface setup procedure. The interface manager is configured, when establishing the interface between the macro radio base station and the femto radio base station gateway, to include abbreviated femtocell information in a message of the interface setup procedure sent between the femto radio base station gateway and the macro radio base station.

In some example embodiment(s) of the node and/or system, the abbreviated femtocell information specifies that the femto radio base station gateway serves a femtocell without identifying any particular femtocell.

In other example embodiment(s) of the node and/or system, the abbreviated femtocell information specifies identities of femtocells which are served by the femto radio base station gateway and which also neighbor a macrocell served by the macro radio base station without identifying any other femtocells.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 3:
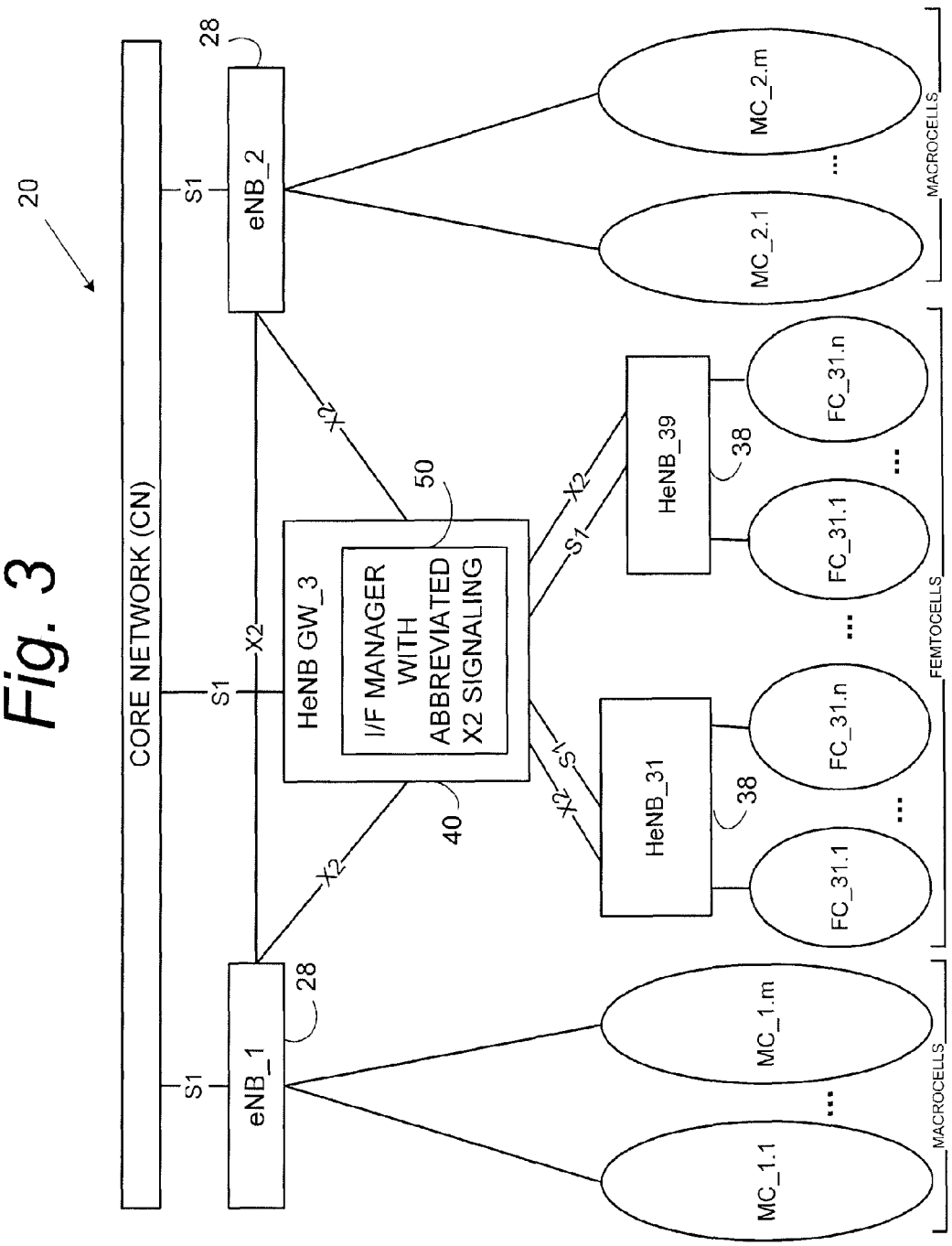
FIG. 3 is a schematic view schematic view of an example telecommunications network with both femto and macrocells which facilitates abbreviated interface signaling according to an example embodiment.

FIG. 3 shows an example embodiment of a telecommunications network 20 with both femto and macrocells, and which facilitates abbreviated interface signaling. The telecommunications system 20 comprises a radio access network, which in turn comprises one or more macro radio base stations, one or more femto radio base stations, and at least one femto radio base station gateway.

In FIG. 3, for sake of simplicity two macro radio base stations 28 are illustrated, which are also respectively known as macro radio base stations eNB_1 and eNB-2. The macro radio base stations 28 are each configured to serve at least one macrocell of a radio access network. For example, macro radio base station eNB_1 serves macrocells MC_1.1 through MC_1.$m$, and macro radio base station eNB_2 serves macrocells MC_2.1 through MC_2.$m$.

FIG. 3 shows plural femto radio base stations 38, which are also denominated as femto radio base stations HeNB_31 through HeNB_39. It should be appreciate that a different, and most likely much larger, number of femto radio base stations may instead be included in a radio access network. In the illustration of FIG. 3, femto radio base station HeNB_31 serves femtocells FC_31.1 through FC_31.$n$; femto radio base station HeNB_39 serves femtocells FC_39.1 through FC_39.$n$; and so forth.

FIG. 3 shows one example and illustrative femto radio base station gateway 40, also referred to as HeNB-GW_3. The femto radio base station gateway 40 (i.e. HeNB-GW_3) serves as the gateway or concentrator node for the femto radio base stations 38. The femto radio base station gateway 40 is shown in FIG. 3 as being connected to the core network and each of its served femto radio base stations 38 by S1 interfaces, and also by X2 interfaces to the two macro radio base stations 28 and its served femto radio base stations 38. Both the S1 interfaces and the X2 interfaces are essentially those which have been described previously.

The technology disclosed herein particularly concerns, in one of its example aspects, particular methods and apparatus for establishing (i.e. setup) of the X2 interface, i.e. an interface between a femto radio base station gateway (such as femto radio base station gateway 40) and a macro radio base station such as node eNB 28. Establishing of the X2 interface between the femto radio base station gateway 40 and a macro radio base station 28 according to the technology disclosed herein advantageously occurs with substantially less signaling information than heretofore required by existing signal procedures, and thereby reduces the signaling load. To this end, the femto radio base station gateway 40 of FIG. 3 is illustrated as comprising interface (I/F) manager 50 which facilitates abbreviated X2 signaling. As explained herein, the interface manager 50 is configured, when establishing the interface between the macro radio base station and the femto radio base station gateway, to include abbreviated femtocell information in a message of the interface setup procedure sent between the femto radio base station gateway and the macro radio base station.

Figure 4:
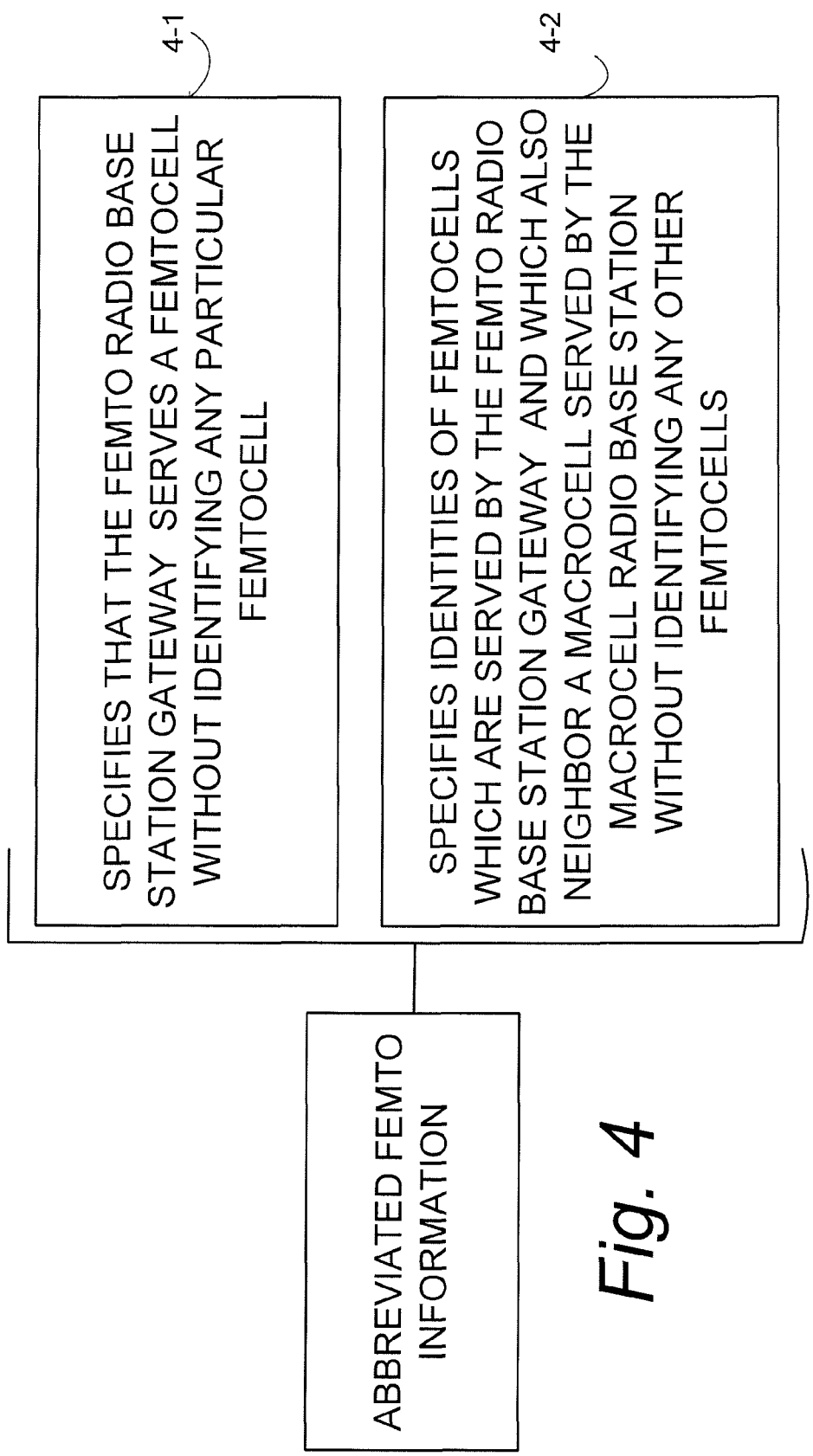
FIG. 4 is a diagrammatic view showing differing embodiments of abbreviated femtocell information.

As used herein, "abbreviated femtocell information" refers to information concerning at least part of the femtocell arrangement serviced by a femto radio base station gateway, but is abbreviated in the sense that it either does not specify any particular femtocells per se or (if it does specify particular femtocells) only specifies a distinct minority of the femtocells served by the femto radio base station gateway. In this regard, FIG. 4 shows two example scenarios of what the abbreviated femtocell information can comprise in differing embodiments. For example, in an example embodiment depicted by symbol 4-1 the abbreviated femtocell information specifies that the femto radio base station gateway serves a femtocell without identifying any particular femtocell. In an example embodiment depicted by symbol 4-2 the abbreviated femtocell information specifies identities of femtocells which are served by the femto radio base station gateway and which also neighbor a macrocell served by the macro radio base station without identifying any other femtocells. The embodiment of symbol 4-2 is thus a scenario in which the abbreviated femtocell information specifies a limited number of femtocells in accordance with a macrocell-relevant criterion (i.e. femtocells which neighbor particular macrocells).

Figure 5:
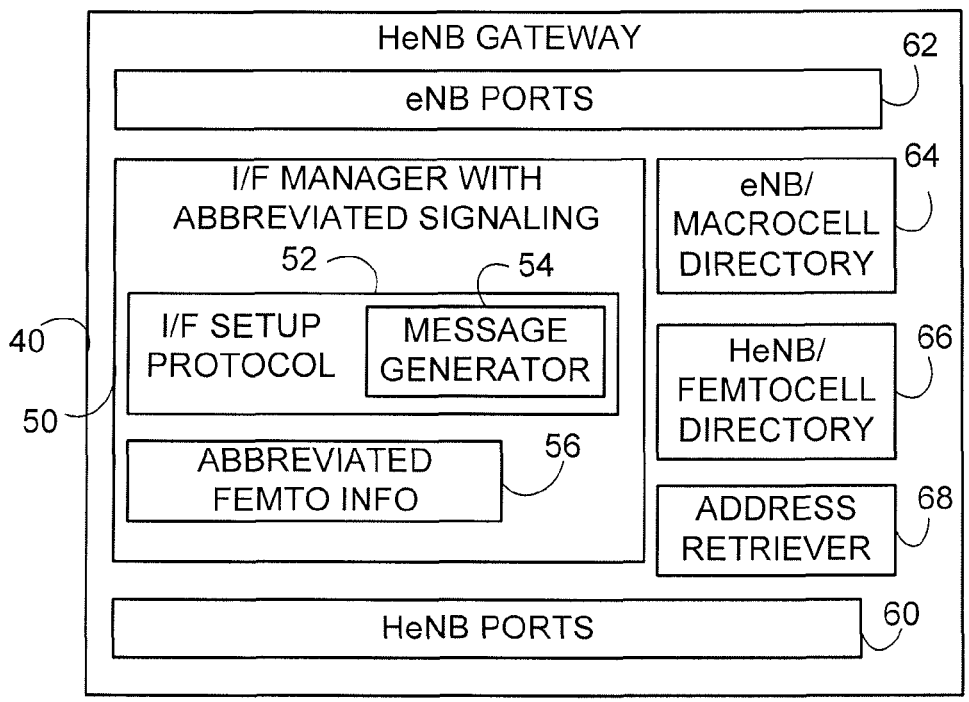
FIG. 5 is a schematic view of an example embodiment of a femto radio base station gateway.

FIG. 5 shows example, non-exhaustive components or functional units of an example embodiment of a femto radio base station gateway such as femto radio base station gateway 40 of FIG. 3. FIG. 5 illustrates that interface (I/F) manager 50 (which facilitates abbreviated X2 signaling) comprises X2 interface setup procedure 52 (which in turn comprises X2 message generator 54) and a memory 56 which stores the abbreviated femtocell information. In addition to its interface (I/F) manager 50, femto radio base station gateway 40 comprises: (1) ports 60 through which connections are formed with the femto radio base stations 38; (2) ports 62 through which connections are formed with the macro radio base stations 28; (3) eNB/macrocell directory 64; (4) HeNB/femtocell directory 66; and (5) address retriever 68. The eNB/macrocell directory 64 is a memory which stores information regarding each of the macro radio base stations with which the femto radio base station gateway 40 has an established X2 interface, as well as associated information regarding the macrocells served by those macro radio base stations. Similarly, the HeNB/femtocell directory 66 is a memory which stores information regarding each of the femto radio base stations with which the femto radio base station gateway 40 has an established X2 interface, as well as associated information regarding the femtocells served by those femto radio base stations.

Figure 6:
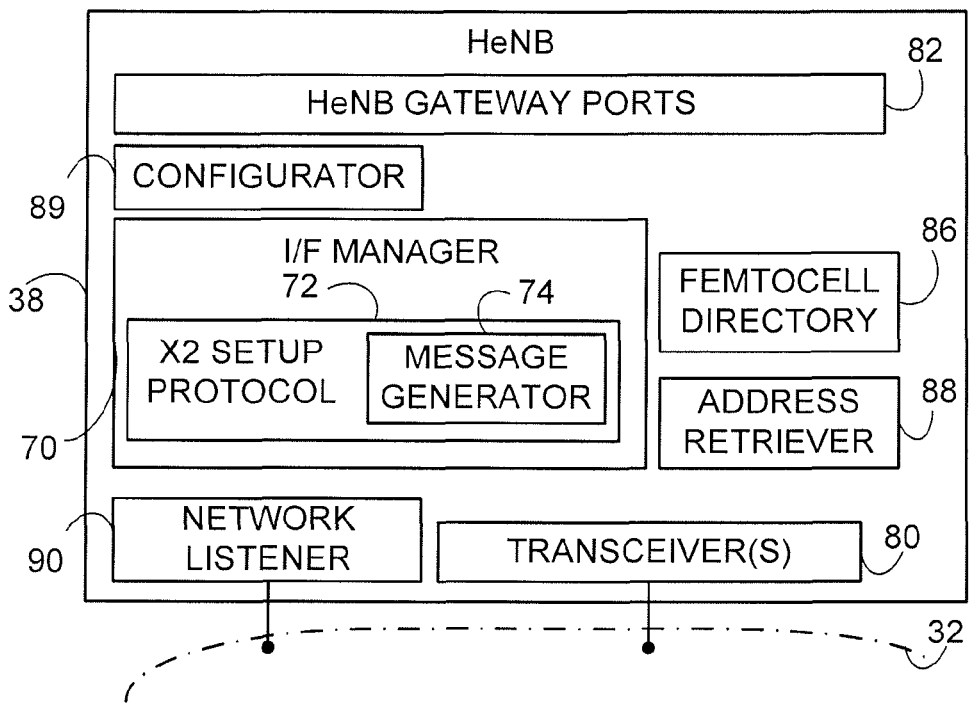
FIG. 6 is a schematic view of an example embodiment of a femto radio base station.

FIG. 6 shows example, non-exhaustive constituent elements or functional units of an example embodiment of a femto radio base station 38. The example femto radio base station 38 comprises interface (I/F) manager 70, which in turns comprises X2 interface setup procedure 72 with its X2 message generator 74, in similar manner as interface (I/F) manager 50 of femto radio base station gateway 40. In addition, the representative femto radio base station 38 comprises: (1) transceiver(s) 80 (which communicate over an air or radio interface 32 with user equipment units 30 (in the femtocells served by the femto radio base station 38); (2) a port 82 through which a connection is formed with the femto radio base station gateway 40; (3) femtocell directory 86; (4) address retriever 88; (5) configurator 89; and (6) network listener 90. The femtocell directory 86 is a memory which stores information regarding each of the femtocells served by femto radio base station 38. The configurator 89 serves as an input device though which information or parameters may be entered into femto radio base station 38.

It will be appreciated by the person skilled in the art that the interface (I/F) manager 50 of femto radio base station gateway 40 and the interface (I/F) manager 70 of femto radio base station 38 can take the form of a processor or controller as those terms are herein expansively elaborated.

At this juncture various comments are provided regarding such topics as identity and IP address of an eNB, Physical Cell Identity, and Network Listener Function and Report.

An eNB is identified by an identifier known as its eNB-ID. An eNB-ID is allocated also to a femto radio base station, i.e. to a HeNB. As a femto radio base station gateway (HeNB-GW) acts as an eNB proxy, a femto radio base station gateway is also allocated an eNB-ID.

Any LTE cell is identified by its E-UTRAN Cell Global Identity (ECGI), which is broadcasted as part of the system information in the LTE cell. An ECGI is a combination of Network identity (PLMN-ID); eNB identity (eNB-ID); and Local cell identity (LC-ID). Thus, for cells served by the same eNB, only LC-ID differs.

The combination of eNB-ID and LC-ID is called Cell Identity (CI). Cell Identity (CI) is defined to be 28 bits, where eNB-ID is 20 bits for a macro radio base station, i.e. an eNB, coping for 256 cells per eNB.

In order for the femto radio base station (HeNB) identity (eNB-ID) to point to the particular femto radio base station gateway (HeNB-GW) that controls the HeNB that serves the femtocell, the eNB-ID for the HeNBs can be divided in two parts. The first part can refer to or identify the HeNB-GW and the second part will be HeNB-unique within the HeNB-GW. For example, the 20 lowest values of a first predetermined number of bits (e.g., 6 bits [64 values]) of the CI are reserved for HeNB-GWs and the rest (44 values) are reserved for eNBs. This allocation makes it possible to have, in a network, up to 20 femto radio base station gateways (HeNB-GWs) each "serving" up to four million femtocells and up to seven hundred thousand (44 times 16 thousands) eNBs, with each eNB serving up to 256 macrocells. With up to four femtocells per HeNB this scheme makes it possible to provide up to one million HeNB per HeNB-GW and up to twenty million HeNBs in a network. There are, of course, other possible solutions to define eNB-ID for eNBs, HeNB-GWs and HeNBs and to indicate the type of eNB-ID, the foregoing being just one illustrative example that does not limit the technology disclosed herein. But with the 3GPP definitions and a scheme for eNB-ID such as that described above by way of example, it will be understood that the identity for an "eNB" (eNB/HeNB/HeNB-GW) can be derived from the E-UTRAN Cell Global Identity (ECGI) of a cell served by the "eNB".

For the purpose of routing messages to the proper "eNB" (eNB/HeNB/HeNB-GW), the IP address can be retrieved by a Domain Name Serice (DNS) query. The eNB-ID, or part of it, shall be part of the used Fully Qualified Domain name (FQDN).

A Physical Cell Identity (PCI) is used on the radio layer to identify the different cells. Physical Cell Identity (PCI) is normally also used in neighboring cell measurements and measurement reporting. The total number of different Physical Cell Identities (PCIs) is limited to five hundred four. Normally the PCI allocation is a demanding task in the network planning to ensure that neighboring macro cells do not use the same PCI. This also means that the PCI for a macrocell in a specific location is unique and sufficient to identify the macrocell.

However, the situation is somewhat different when it comes to femtocells. The femtocells are also identified with a Physical Cell Identity (PCI) on the radio layer. The femtocells are installed by the end users without any intervention from the operator's personnel, and this means that Physical Cell Identity (PCI) planning is not possible. Also the number of femtocells may be very high. The current working assumption is to dedicate some of the available five hundred four PCIs (for example about fifty PCIs) for the femtocells only. However, it is totally possible that there may be more than fifty femtocells in the coverage of one macro cell. This leads to a situation commonly called as "PCI confusion". "PCI confusion" is a situation in which the PCI is not unique and or sufficient and the E-UTRAN Cell Global Identity (ECGI) is needed to uniquely identify a femtocell. It is also preferred to configure the different network nodes (eNB, HeNB-GW and HeNB) with information about the PCI values dedicated for the femtocells to be able to know when the "PCI confusion" is possible.

As indicated above, a femto radio base station 38 comprises network listener (NWL) 90 (see FIG. 6). The network listener 90 comprises, e.g., a UE receiver integrated in the femto radio base station (HeNB) 38. The network listener 90 has at least the capability to collect information, including system information, from the neighbor macrocells, i.e. the macrocells which neighbor the femtocell served by the femto radio base station 38. The network listener 90 is used when the HeNB is powered-on and preferably also regularly thereafter since the macrocell surrounding may change in time. A change in the macrocell surrounding may also be monitored with an Automatic Neighbor Cell Relation (ANR) function. The important information per detected macrocell is the aforementioned E-UTRAN Cell Global Identity (ECGI). This means that the identity of the eNBs and its served cells, that the network listener 90 or the ANR function has detected, can be derived.

During the setup or commissioning of a femto radio base station (HeNB) and at any subsequent change of the macrocell surrounding, the HeNB reports to its controlling HeNB-GW the particular neighbor macrocells that its network listener 90 or the ANR function has detected. The report (herein called the "Macrocell Surrounding Report") is sent over a management interface not shown in FIG. 3.

Figure 7:
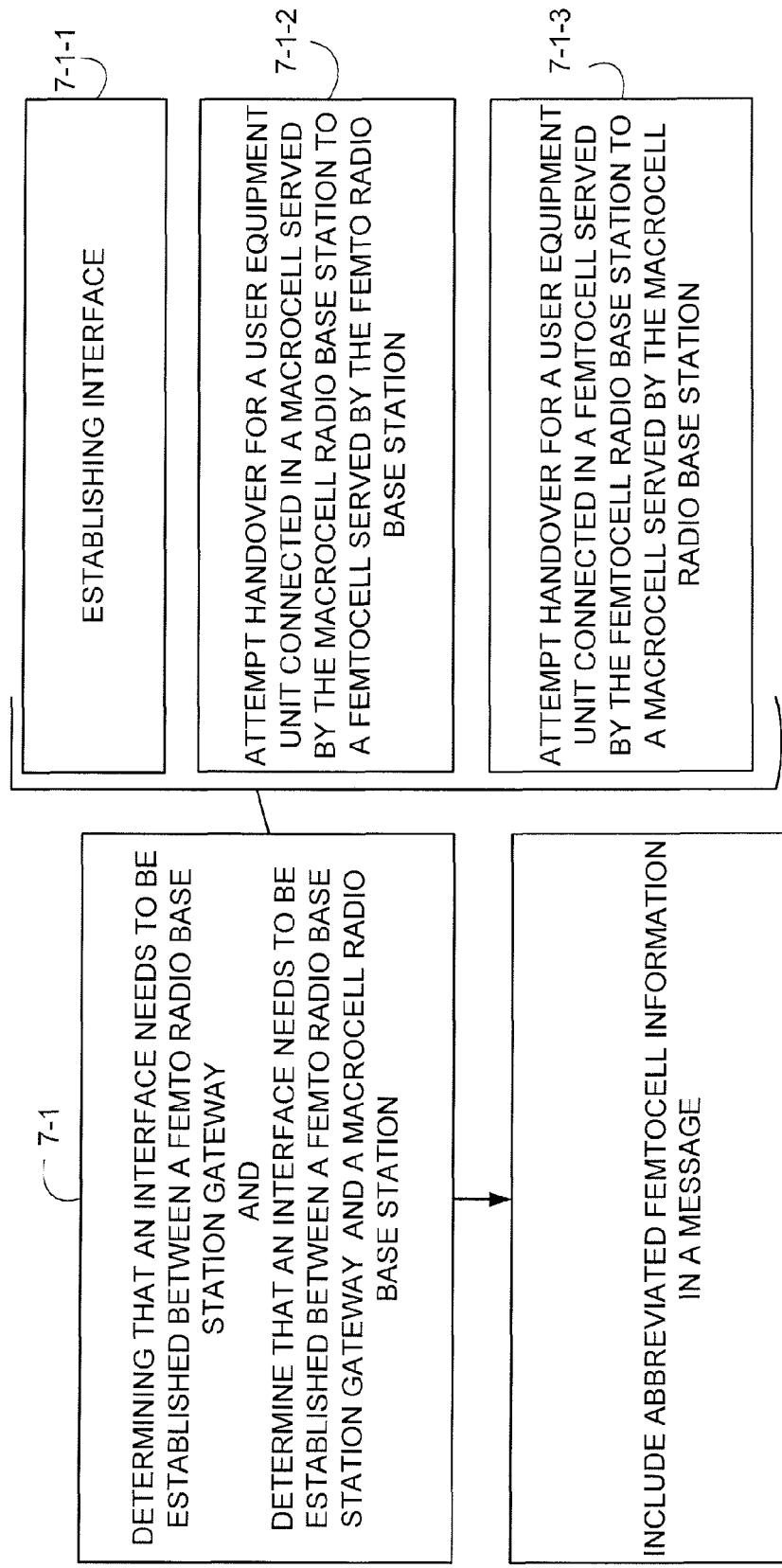
FIG. 7 is a partial flowchart illustrating basic, example, non-limiting acts or steps which are included in a method of operating the telecommunications of FIG. 3.

In one of its aspects, the technology disclosed herein concerns a method of operating a radio access network. FIG. 7 illustrates basic, example, non-limiting acts or steps which are included in the method. Act 7-1 comprises determining that an interface needs to be established between a femto radio base station gateway and a macro radio base station. Act 7-2 comprises, when establishing the interface between the macro radio base station and the femto radio base station gateway, including abbreviated femtocell information in a message of an interface setup procedure sent between the femto radio base station gateway and the macro radio base station.

FIG. 7 further illustrates that act 7-1, i.e. the act of determining that an interface needs to be established between the femto radio base station gateway and the macro radio base station, can comprise any one of act 7-1-1 through act 7-1-3. Act 7-1-1 comprises establishing an interface between the femto radio base station and the femto radio base station gateway. Act 7-1-2 comprises the macro radio base station attempting a handover for a user equipment unit connected in a macrocell served by the macro radio base station to a femtocell served by the femto radio base station. Act 7-1-3 comprises the femto radio base station attempting a handover for a user equipment unit connected in a femtocell served by the femto radio base station to a macrocell served by the macro radio base station.

Figure 1:
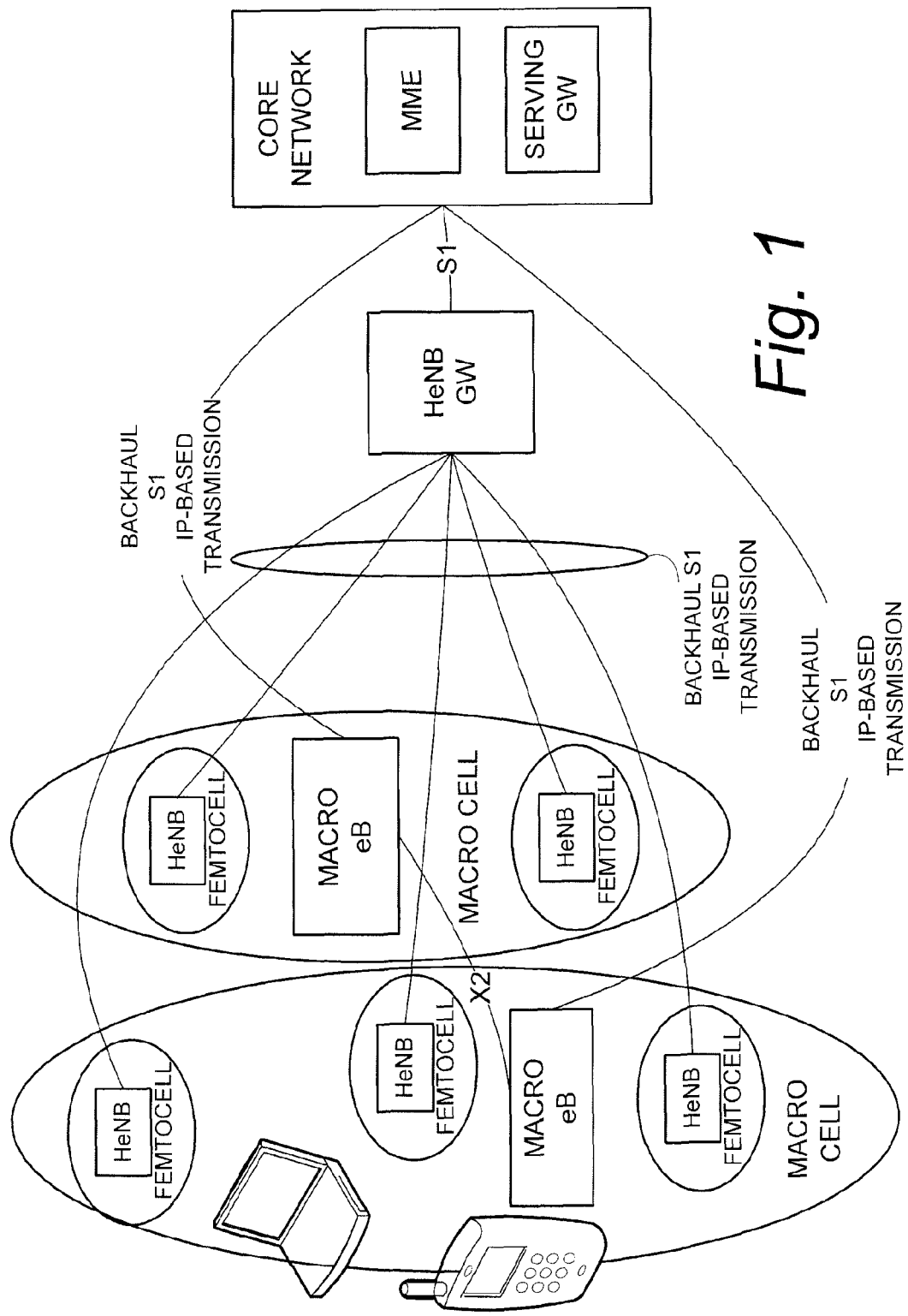
FIG. 1 is a schematic view of an exemplary LTE/SAE network with both femto and macrocells.
Figure 2:
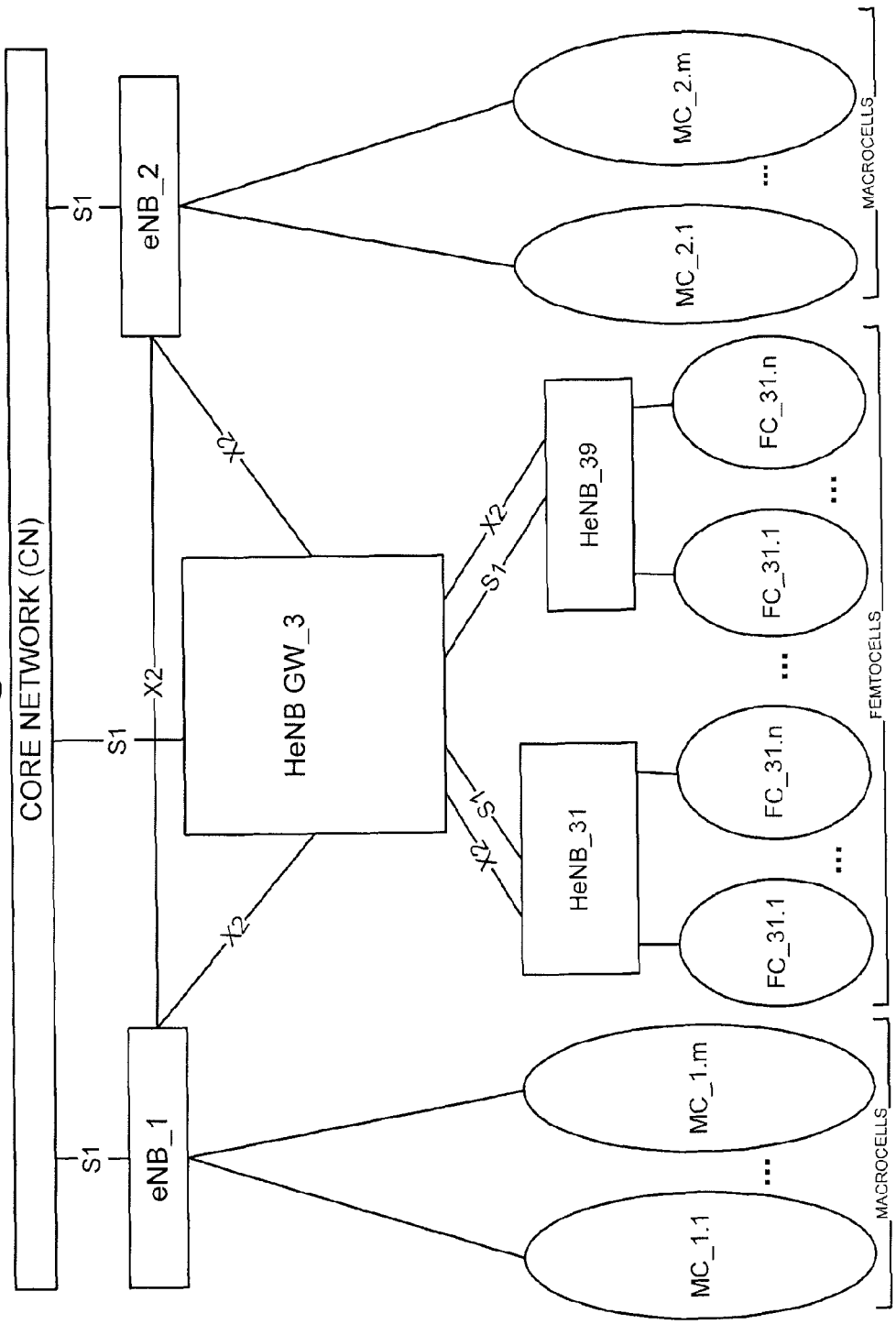
FIG. 2 is another schematic view of an exemplary LTE/SAE network with both femto and macrocells.
Figure 8:
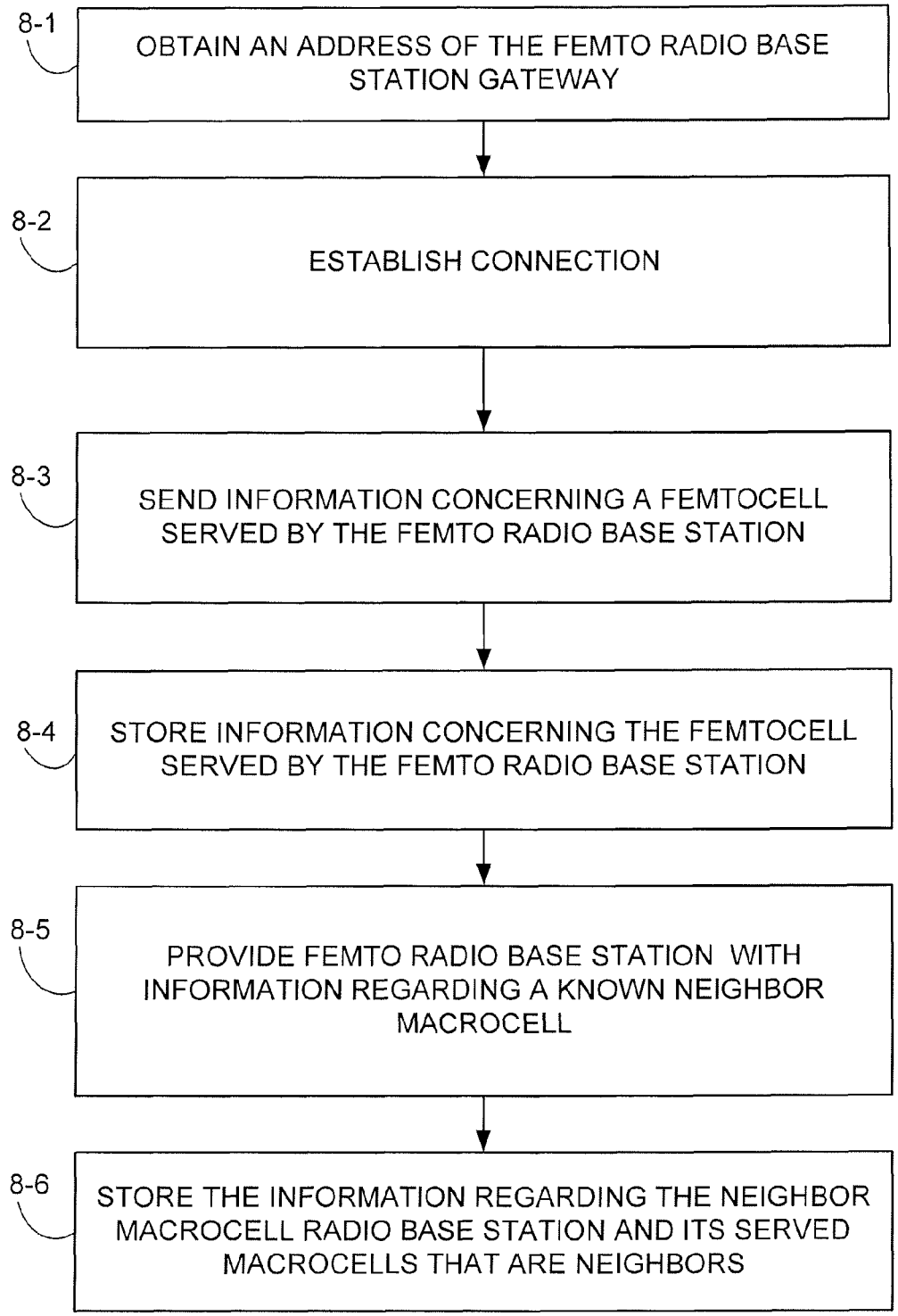
FIG. 8 is a flowchart illustrating basic, example, non-limiting acts or steps for establishing an interface between a femto radio base station and the femto radio base station gateway in one example implementation or mode.

In one example implementation or mode the method further comprises establishing an interface between a femto radio base station and the femto radio base station gateway. In this implementation or mode the X2 interface between a HeNB (e.g. HeNB_31 in FIG. 2) and its controlling HeNB-GW (HeNB-GW_3 in FIG. 2) is set up during the HeNB commissioning. The interface setup is initiated in the HeNB after sending of the aforementioned Macrocell Surrounding Report (which includes neighbor macrocells) to the HeNB-GW. Establishing the interface between a femto radio base station and the femto radio base station gateway can comprise the example acts of steps of FIG. 8.

As act 8-1, the HeNB_31 retrieves the IP address of its controlling HeNB-GW (HeNB-GW_3). The IP address, or an FQDN used in a DNS query, may be configured during the commissioning of the HeNB. Configuring of the IP address can be accomplished through configurator 89 (see FIG. 6).

As act 8-2 an SCTP connection for the X2 interface between HeNB_31 and HeNB-GW_3 is established.

As act 8-3 the HeNB_31 sends, with the X2AP 'X2 SETUP REQUEST' message, information on its served femtocells (FC_31.1 . . . FC_31.*n*) to HeNB-GW_3. The Physical Cell Identity (PCI) and the E-UTRAN Cell Global Identity (ECGI) for each cell is part of this information. Included in the request message is also its ID (eNB-ID_31).

As act 8-4 the HeNB-GW_3 stores the information on the HeNB with eNB-ID_31 and its served femtocells.

As act 8-5 the HeNB-GW_3 responds, with the X2AP 'X2 SETUP RESPONSE' message, with information on the ones of its known neighbor macrocells included in the Macrocell Surrounding Report from HeNB_31 (e.g. MC_2.1 and MC_2.5). By "known neighbor macrocells" means macrocells served by eNBs to which HeNB-GW has an X2 interface and thus information on the served macrocells. If there is none of the known neighbor macrocells included in the Macrocell Surrounding Report, HeNB-GW_3 indicates that in a new information element in the response message. Included in the response message is also the identity of the HeNB-GW (eNB-ID_3).

As act 8-6 the HeNB_31 stores the information on the "eNB" with eNB-ID_3 and its "served" macrocells that are neighbors to HeNB_31's femtocells.

Each of act 8-1 through and including act 8-6 are included in the setup of the X2 interface. A HeNB has only one X2 interface to its controlling HeNB-GW. A HeNB may also have X2 interfaces to other HeNBs. The X2 interface between a HeNB and its controlling HeNB-GW is maintained until the HeNB is released or lost.

Figure 9:
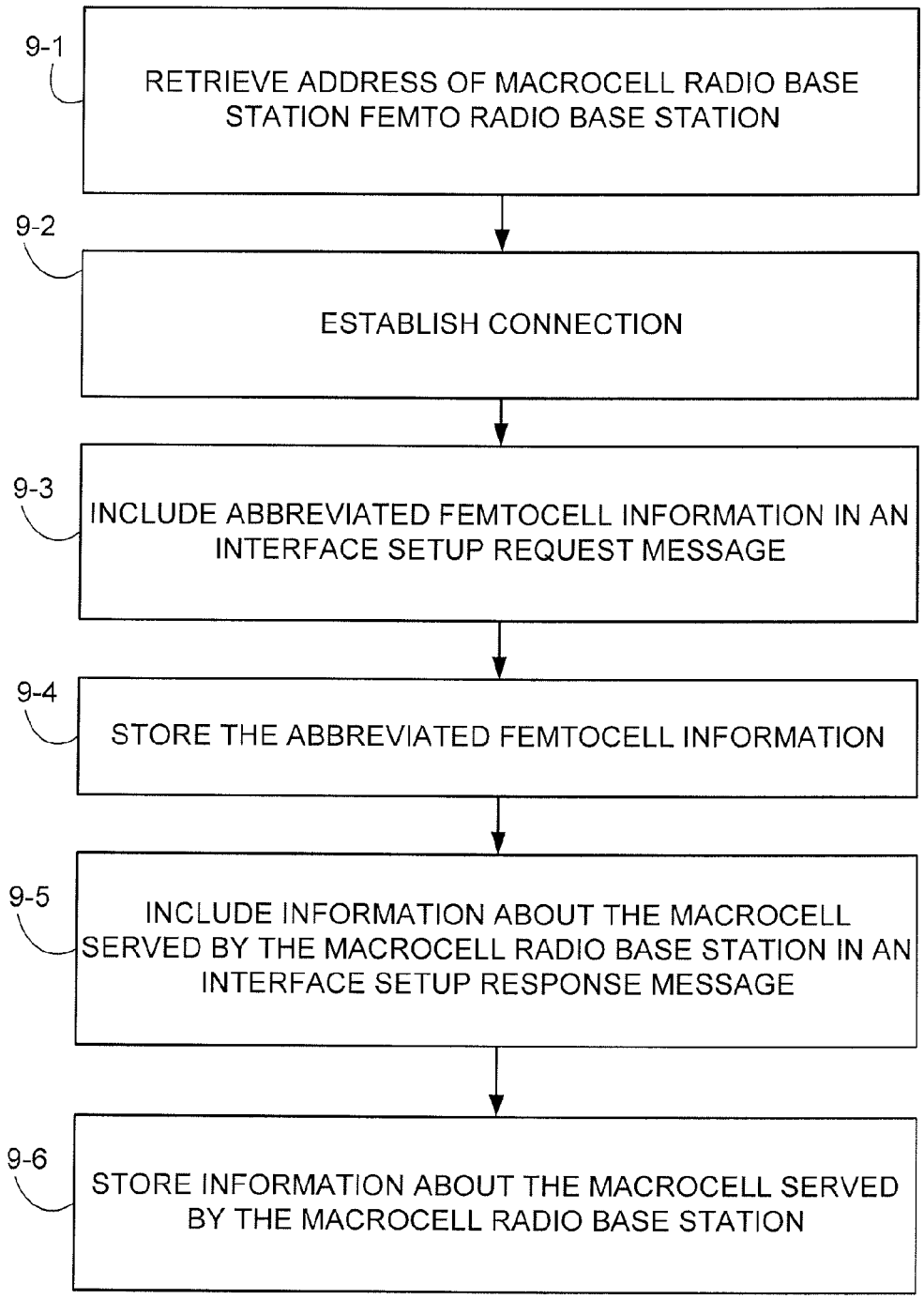
FIG. 9 is a flowchart illustrating basic, example, non-limiting acts or steps for establishing an interface between the femto radio base station gateway and the macro radio base station in one example implementation or mode.
Figure 12:
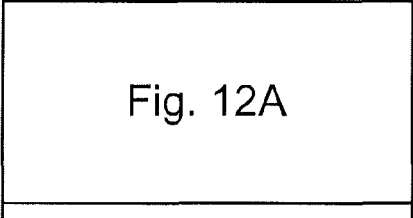
FIG. 12 is a diagrammatic view showing a relationship of acts of FIG. 12A, FIG. 12B, and FIG. 12C.
Figure 12:
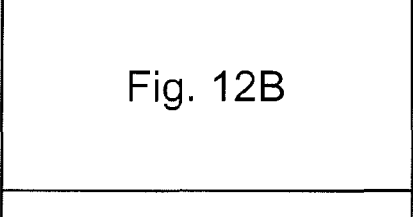
Figure 12:
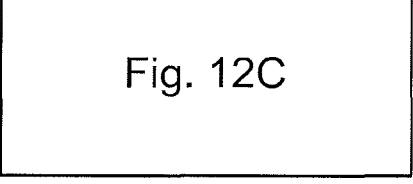

Unless already set up, the X2 interface between a HeNB-GW (HeNB-GW_3 in FIG. 2) and an eNB (e.g., eNB_1 in FIG. 2) is set up after the HeNB-GW has received the Macrocell Surrounding Report from a HeNB, under commissioning (e.g HeNB_31). In another example implementation or mode, the act of establishing the interface between the femto radio base station gateway and the macro radio base station occurs, e.g., in the context of commissioning of a femto radio base station. Establishing the interface between the femto radio base station gateway and the macro radio base station can comprise the example acts of steps of FIG. 9.

Act 9-1 comprises the HeNB-GW_3 retrieving the IP address of each of the eNBs whose served macrocells are included in the Macrocell Surrounding Report from HeNB_31. The retrieval can be from E-UTRAN Cell Global Identity (ECGI) via eNB-ID to IP address. eNB_1 is one such eNB for which X2 is not already established.

Act 9-2 comprises establishing an SCTP connection for X2 between HeNB-GW_3 and eNB_1.

Act 9-3 comprises the HeNB-GW_3 sending, with the X2AP 'X2 SETUP REQUEST' message, the abbreviated femtocell information. In one example implementation and mode illustrated by symbol 4-1 of FIG. 4, the abbreviated femtocell information resides in a new information element and simply indicates the fact that HeNB-GW_3 serves femtocells, without specifying (i.e. identifying) any such particular served femtocell. The HeNB-GW_3 does include in this message its own ID. In another example implementation and mode illustrated by symbol 4-2 of FIG. 4, the abbreviated femtocell information is information about the femtocells "served" by HeNB-GW_3 that are neighbors to the macrocells, served by eNB_1 (FC_31.1 . . . FC_31.*n*), to eNB_1. Included in the request message is also its ID (eNB-ID_3).

Act 9-4 comprises the eNB_1 storing the information on the "eNB" with eNB-ID_3 and its abbreviated femtocell information.

Act 9-5 comprises the eNB_1 responding, with the X2AP 'X2 SETUP RESPONSE' message, with information on its served macrocells (MC_1.1 . . . MC_1.*m*). The Physical Cell Identity (PCI) and E-UTRAN Cell Global Identity (ECGI) for each cell is part of this information. Included in the response message is also the identity (eNB-ID_1) of the eNB.

Act 9-6 comprises the HeNB-GW_3 storing the information on the eNB with eNB-ID_1 and its served macrocells.

Each of act 9-1 through and including act 9-6 are included in the setup of the X2 interface. Act 9-2, 9-3, 9-4, 9-5, and 9-6 are repeated for the eNBs whose IP address is retrieved in act 9-1 and for which the X2 interface is not already set up.

Concerning the embodiment depicted by symbol 4-2 of FIG. 4, for the eNBs whose IP address is retrieved in act 9-1 and for which the X2 interface is already established, the list of femtocells "served" by HeNB-GW_3 is updated by HeNB-GW_3, with the X2AP 'ENB CONFIGURATION UPDATE' message, with information on the femtocells served by HeNB-31 (FC-31.1 . . . FC-31.*n*).

Unless already set up, the X2 interface between a HeNB-GW (HeNB-GW_3 in FIG. 2) and an eNB (e.g. eNB_1 in FIG. 2) is set up in one of the following cases, each of which is discussed separately below:

Macrocell to Femtocell Handover: When eNB_1 decides to attempt handover for a UE connected in one of its macrocells, e.g., MC_1.1, to one of the femtocells "served" by HeNB-GW_3, e.g., FC_31.1.

Femtocell to Macrocell Handover: When HeNB_31 decides to attempt handover for a UE connected in one of its femtocells, e.g., FC_31.*n*, to one of the macrocells served by eNB_1, e.g., MC_1.*m* and the request for that handover from HeNB_31 is received in HeNB-GW_1

Handover between femtocells may be handled as handover between macrocells.

Before discussing the two handover cases, further comments are provided in conjunction with the implementation or mode of symbol 4-2 of FIG. 4. The HeNB-GW maintains, per neighbor eNB, a list of its "served" femtocells that are neighbors to the macrocells served by the eNB. The lists are created or updated when the Macrocell Surrounding Report from a HeNB is received. The report contains, among other things, the E-UTRAN Cell Global Identity (ECGI) of the macrocells which the network listener 90 or the ANR function has detected. This means that the HeNB-GW can, from the Macrocell Surrounding Report, derive the eNB-ID of the eNBs that are neighbors to the HeNB as eNB-ID can be derived from ECGI. If there is no list for a neighbor eNB, a new list is created and the ECGIs of the femtocells, configured for the reporting HeNB, are added to that list. If there already is a list for the neighbor eNB, the ECGIs of the femtocells, configured for the reporting HeNB, are added to that list unless already in the list.

A HeNB disconnection by the end-user will be detected in the HeNB-GW as a loss of the SCTP connection that carries X2AP (and also by a loss of the SCTP connection that carries S1AP). When this happens, the femtocells served by the lost HeNB are removed from all the lists. A subsequent HeNB connection by the end-user is identical to the initial commissioning of the HeNB.

An addition or removal of a femtocell from a list related to a certain eNB results in an update of the "served" femtocell list from the HeNB-GW to that eNB. This is done by HeNB-GW sending the X2AP 'ENB CONFIGURATION UPDATE' message. A change due to addition of a femtocell shall result in an immediate update while a change due to a removal may optionally be time filtered with a configurable time. The reason for the latter is that a removal may be followed by an addition of the same cell, e.g. at a HeNB reboot or a short power outage, and the signaling to an eNB shall be kept to a minimum.

The HeNB-GW also maintains a list of all its "served" femtocells and information for each served cell.

Figure 10:
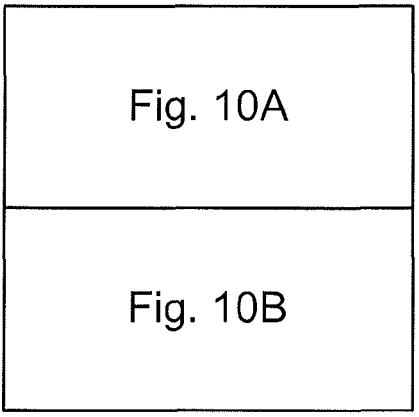
FIG. 10 is a diagrammatic view showing a relationship of acts of FIG. 10A and FIG. 10B.
Figure 10:
Figure 10A:
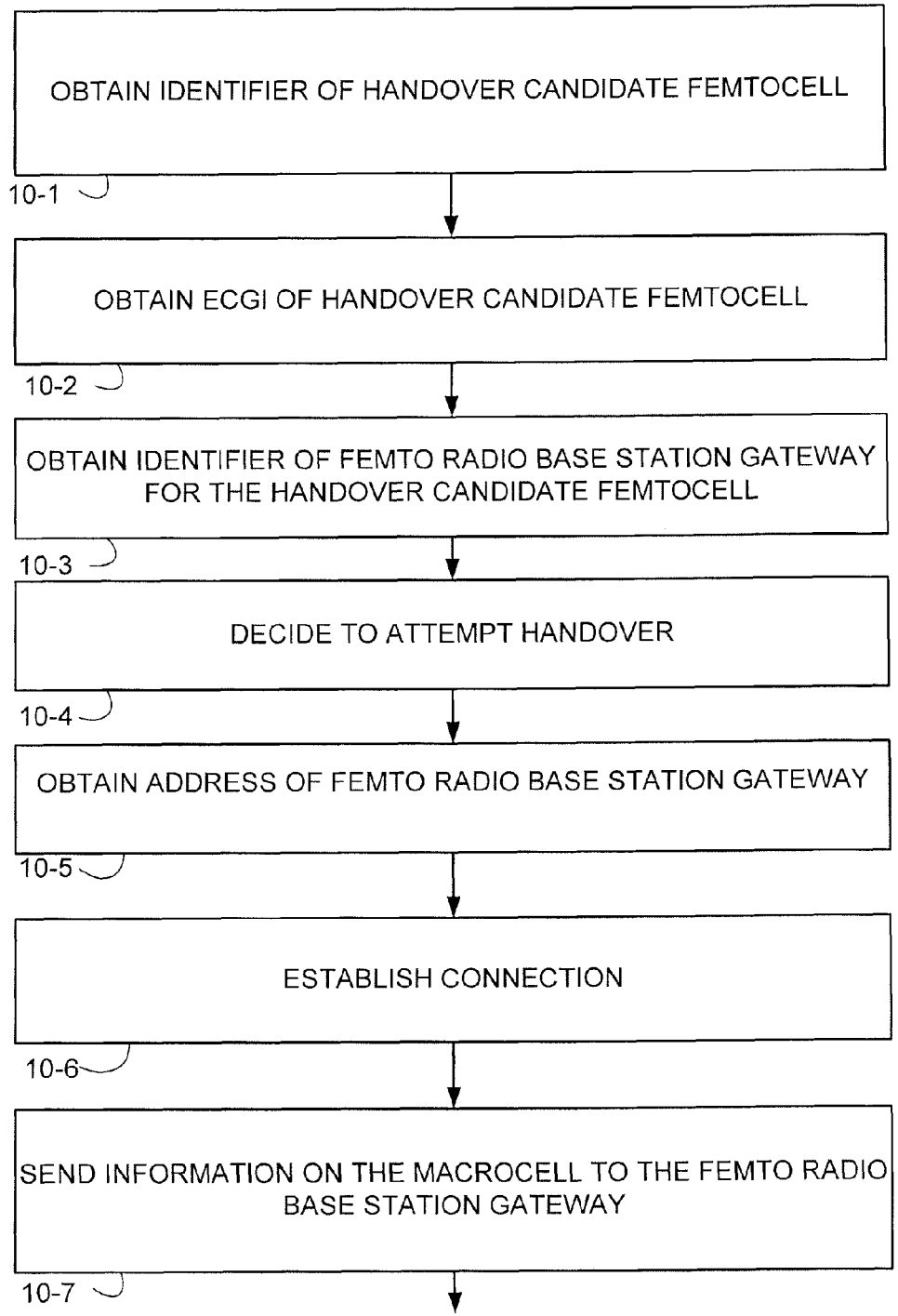
FIG. 10A and FIG. 10B are flowcharts illustrating basic, example, non-limiting acts or steps for establishing an interface between the femto radio base station gateway and the macro radio base station in the context of an attempted handover from a macrocell to a femtocell in one example implementation or mode.
Figure 10B:
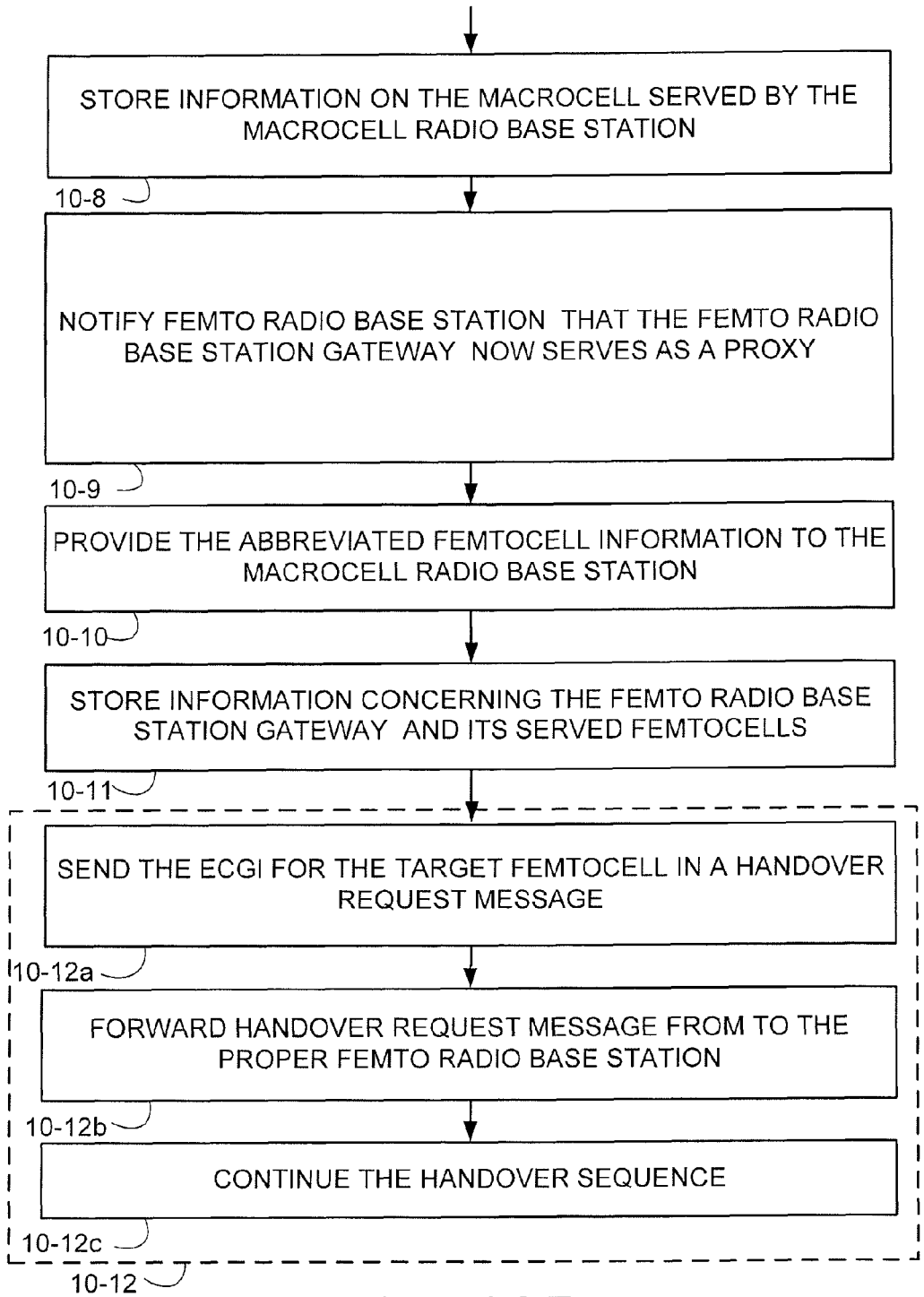

Now, for further explanation of the first case described above, in another example implementation or mode the method the act of establishing the interface between the femto radio base station gateway and the macro radio base station occurs in the context of an attempted handover from a macrocell to a femtocell. Establishing the interface between the femto radio base station gateway and the macro radio base station occurs in the context of an attempted handover from a macrocell to a femtocell can comprise the example acts or steps of FIG. 10A and FIG. 10B.

Act 10-1 comprises the eNB (eNB_1) receives, from a UE in one of its macrocells (e.g. MC_1.1), the Physical Cell Identity (PCI) of the handover candidate femtocell (e.g. FC_31.1).

Since the eNB_1 does not have an X2 set up to the eNB that serves that cell (HeNB_31) or to its eNB proxy (HeNB-GW_3), the eNB_1 does not have any information on the cell with the received PCI, including the relation between the received PCI and the corresponding E-UTRAN Cell Global Identity (ECGI). Besides, the eNB_1 will recognize the PCI as being one for a femtocell and thus subject to possible "PCI confusion". Therefore as act 10-2 the eNB_1 requests the ECGI from the user equipment unit.

Act 10-3 comprises the eNB_1 deriving, from the ECGI for FC_31.1, the ID of the serving eNB (eNB-ID_3). In this case it results in a HeNB-GW (HeNB-GW_3) acting as the eNB proxy for the actual HeNB (HeNB_31).

Act 10-4 comprises the eNB_1 deciding to attempt handover from MC_1.1 to FC_31.1. It may be an 'S1 initiated handover' or an 'X2 initiated handover'. For 'S1 initiated handover', the S1 interface is used and the X2 interface is not needed. 'S1 initiated handover' is initiated by eNB_1 sending the S1AP 'HANDOVER REQUIRED' message, including the target ECGI for FC_31.1, to the controlling MME and continues according to standardized S1 procedures. However, the X2 interface is set up for future handovers. For 'X2 initiated handover', the X2 interface is needed and thus set up.

Act 10-5 comprises the eNB_1 retrieving the IP address of the HeNB-GW_3 from eNB-ID_3.

Act 10-6 comprises establishing an SCTP connection for the X2 interface between eNB_1 and HeNB-GW_3.

Act 10-7 comprises the eNB_1 sending, with the X2AP 'X2 SETUP REQUEST' message, information on its served macrocells (MC_1.1 . . . MC_1.m) to HeNB-GW_3. The Physical Cell Identity (PCI) and the E-UTRAN Cell Global Identity (ECGI) for each cell is part of this information.

Act 10-8 comprises the HeNB-GW_3 storing the information on the eNB with eNB-ID_1 and its served macrocells.

Act 10-9 comprises the HeNB-GW_3 updating, with the X2AP 'ENB CONFIGURATION UPDATE' messages, its controlled HeNBs (HeNB_31 . . . HeNB_39) that the HeNB-GW_3 is now an eNB proxy also for macrocells MC_1.1 to MC_1.m. In order to reduce the signaling, this update is sent only to those HeNBs whose latest Macrocell Surrounding Report includes at least one of the macrocells served by eNB_1. Only macrocells included in the Macrocell Surrounding Report may be included in the message in order to reduce the size of the message. The X2 interface between HeNB-GW_3 and its controlled HeNBs is set up already at HeNB commissioning.

Act 10-10 comprises the HeNB-GW_3 responds, with the X2AP 'X2 SETUP RESPONSE' message, in which is included the abbreviated femtocell information. In one example implementation and mode illustrated by symbol 4-1 of FIG. 4, the abbreviated femtocell information resides in a new information element and simply indicates the fact that HeNB-GW_3 serves femtocells, without specifying (i.e. identifying) any such particular served femtocell. In another example implementation and mode illustrated by symbol 4-2 of FIG. 4, the abbreviated femtocell information is information about the femtocells "served" by HeNB-GW_3 that are neighbors to the macrocells served by eNB_1. The cells are from the list for eNB_1. The Physical Cell Identity (PCI) and the E-UTRAN Cell Global Identity (ECGI) can comprise this information. Included in the message is also the identity of the HeNB-GW (eNB-ID_3).

Act 10-11 comprises the eNB_1 stores the information on the "eNB" with eNB-ID_3 and its abbreviated femtocell information.

In the case of 'X2 initiated handover', the subacts comprising act 10-12 are performed. Subact 10-12a comprises the eNB_1 sending the X2AP 'HANDOVER REQUEST' message, including the target ECGI for FC_31.1, to HeNB-GW_3 over the newly set up X2 interface. Subact 10-12b comprises the HeNB-GW_3 forwarding the X2AP 'X2 HANDOVER REQUEST' message from eNB_1 to the proper HeNB, i.e. HeNB_31, based on the eNB-ID derived from the target ECGI (eNB-ID_31). Subact 10-12c comprises continuing the handover sequence according to standardized X2 and S1 procedures for 'X2 initiated handover'.

Acts 10-5, 10-6, 10-7, 10-8, 10-10, and 10-11 are actually included in the X2 interface setup procedure. Act 10-9 is an update needed to maintain the X2 interface. The other acts are shown to clarify why and when the X2 interface is set up and updated.

Figure 11:
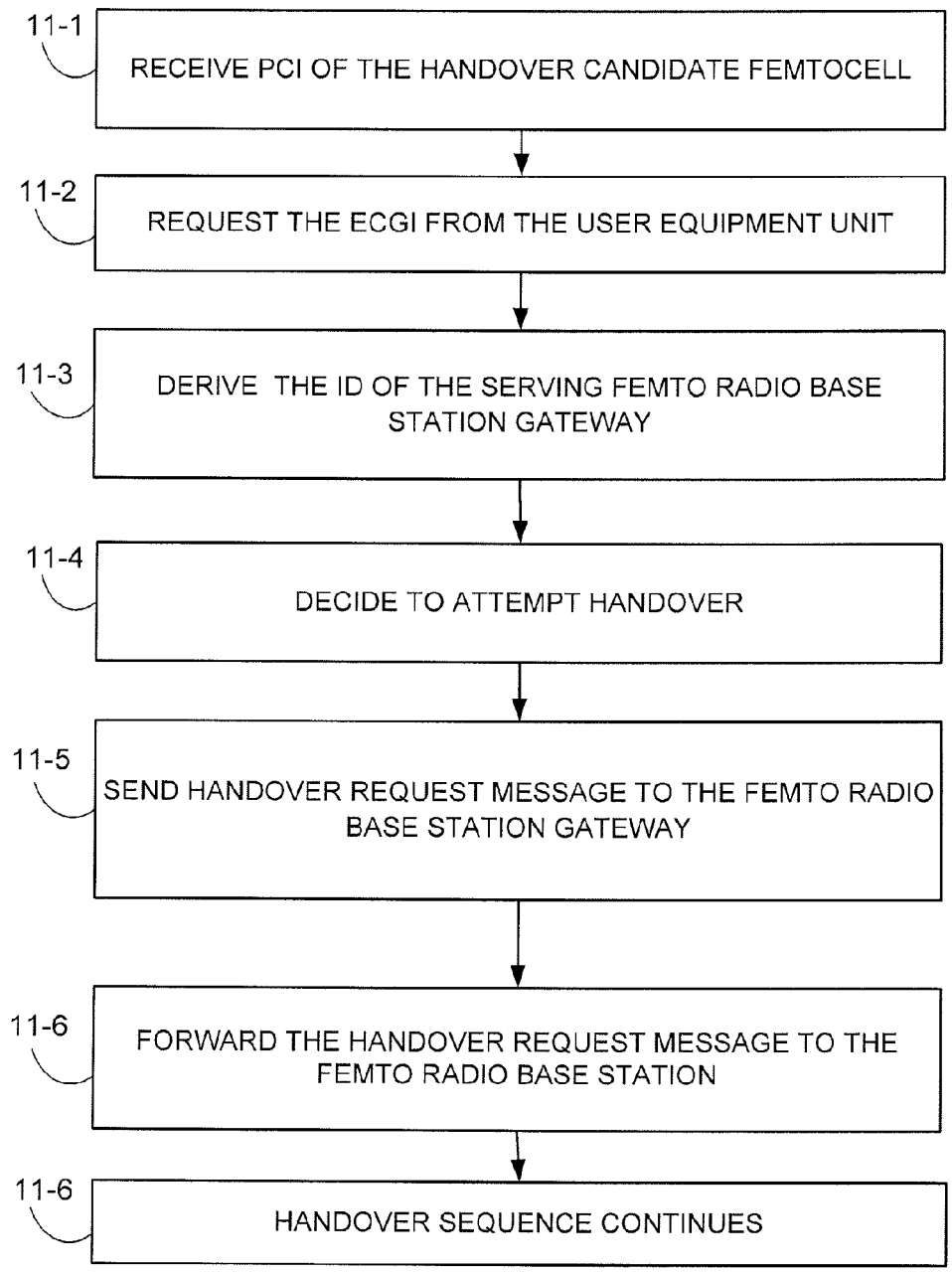
FIG. 11 is a flowchart illustrating basic, example, non-limiting acts or steps performed in a handover from a macrocell to a femtocell when an interface is already set up.

FIG. 11 illustrates example acts or steps performed in a handover from a macrocell to a femtocell when the X2 interface is already set up.

Act 11-1 comprises the eNB (eNB_1) receiving, from a user equipment unit in one of its macrocells (e.g. MC_1.1), the Physical Cell Identity (PCI) of the handover candidate femtocell (e.g. FC_31.1).

The eNB_1 has an X2 interface set up all the way to the eNB that serves that femtocell (HeNB_31) via HeNB-GW_3, so it has a relation between the received PCI and a E-UTRAN Cell Global Identity (ECGI). However, the eNB_1 will recognize the PCI as being one for a femtocell and thus subject to possible "PCI confusion". Therefore, as act 11-2, the eNB_1 requests the ECGI from the user equipment unit.

Act 11-3 comprises the eNB_1 deriving, from the ECGI for FC_31.1, the ID of the serving eNB (eNB_3). In this case it results in a HeNB-GW (HeNB-GW_3) acting as the eNB proxy for the actual HeNB (HeNB_31).

Act 11-4 comprises the eNB_1 deciding to attempt handover from MC_1.1 to FC_31.1. The handover will be an 'X2 initiated handover'. For this, the already set up X2 interface is used.

Act 11-5 comprises the eNB_1 sending the X2AP 'HANDOVER REQUEST' message, including the target ECGI for FC_31.1, to the HeNB-GW_3.

Act 11-6 comprises the HeNB-GW_3 forwarding the X2AP 'HANDOVER REQUEST' message from eNB_1 to the proper HeNB, i.e. HeNB_31, based on the eNB-ID derived from the target ECGI (eNB-ID_31).

Act 11-7 depicts the handover sequence continuing according to standardized X2 and S1 procedures for 'X2 initiated handover'.

In the handover depicted by FIG. 11, no act or step is actually part of the X2 interface setup procedure. The acts of FIG. 11 are shown for clarification and to describe how the already set up X2 interface is used for 'X2 initiated handover'.

In another example implementation or mode the method the act of establishing the interface between the femto radio base station gateway and the macro radio base station occurs in the context of an attempted handover from a femtocell to a macrocell. Establishing the interface between the femto radio base station gateway and the macro radio base station occurs in the context of an attempted handover from a femtocell to a macrocell can comprise the example acts of steps of FIG. 12A and FIG. 12B and FIG. 12C.

Act 12-1 comprises the HeNB (HeNB_31) receiving, from a user equipment unit in one of its femtocells (e.g. FC_31.*n*), the Physical Cell Identity (PCI) of the handover candidate macrocell (e.g. MC_1.*m*).

Since the HeNB_31 does not have an X2 interface set up all the way to the eNB that serves that cell (eNB_1), the HeNB_31 does not have any information on the cell with the received Physical Cell Identity (PCI), including the relation between the received PCI and the corresponding E-UTRAN Cell Global Identity (ECGI). Therefore as act 12-2 the HeNB_31 requests the ECGI from the user equipment unit. The HeNB_31 will recognize the Physical Cell Identity (PCI) as being one for a macrocell and thus not subject to possible "PCI confusion".

As act 12-3 the HeNB_31 derives, from the ECGI for MC_1.*m*, the ID of the serving eNB. In this case it results in an eNB (eNB_1) and thus the handover candidate cell is a macrocell. As the controlling HeNB-GW (HeNB-GW_3) acts as eNB proxy for all eNBs, seen from HeNB_31, a handover request for a macrocell shall be sent to HeNB-GW_3 (included in act 12-3).

Act 12-4 comprises the HeNB_31 deciding to attempt handover from FC_31.*n* to MC_1.*m*. The handover may be an 'S1 initiated handover' or an 'X2 initiated handover'.

Figure 12A:
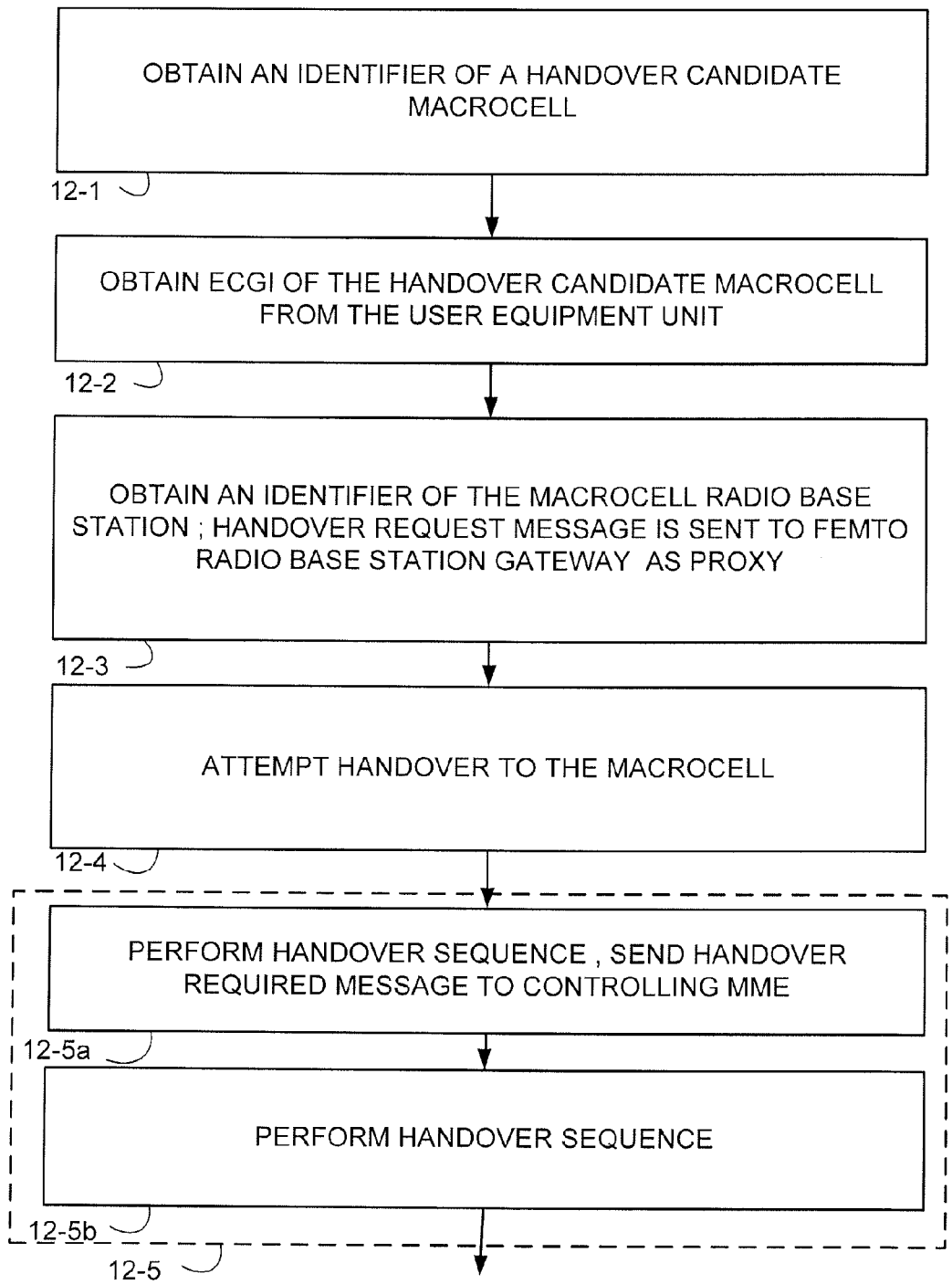
FIG. 12A, FIG. 12B, and FIG. 12C are flowcharts illustrating basic, example, non-limiting acts or steps for establishing an interface between the femto radio base station gateway and the macro radio base station in the context of an attempted handover from a femtocell to a macrocell in one example implementation or mode.
Figure 12B:
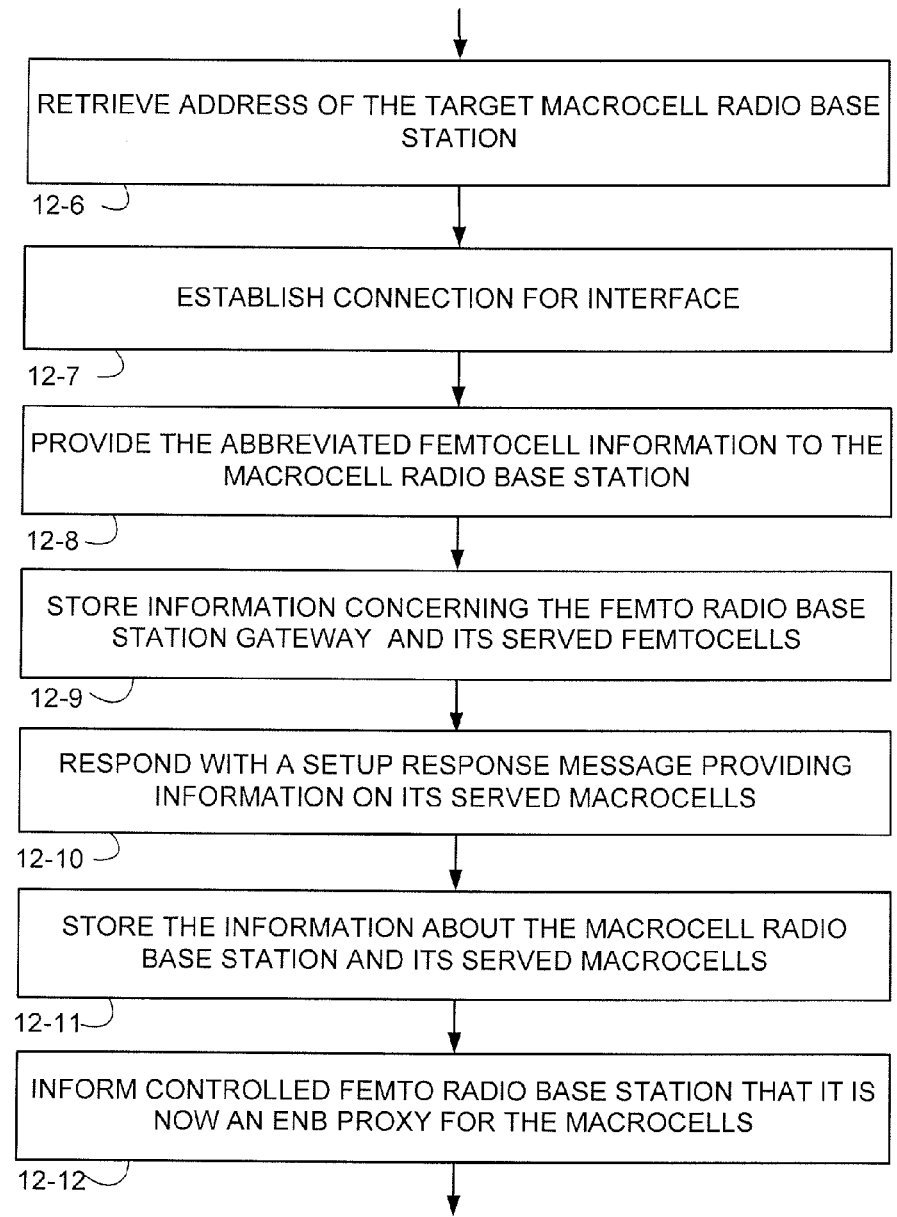
Figure 12C:
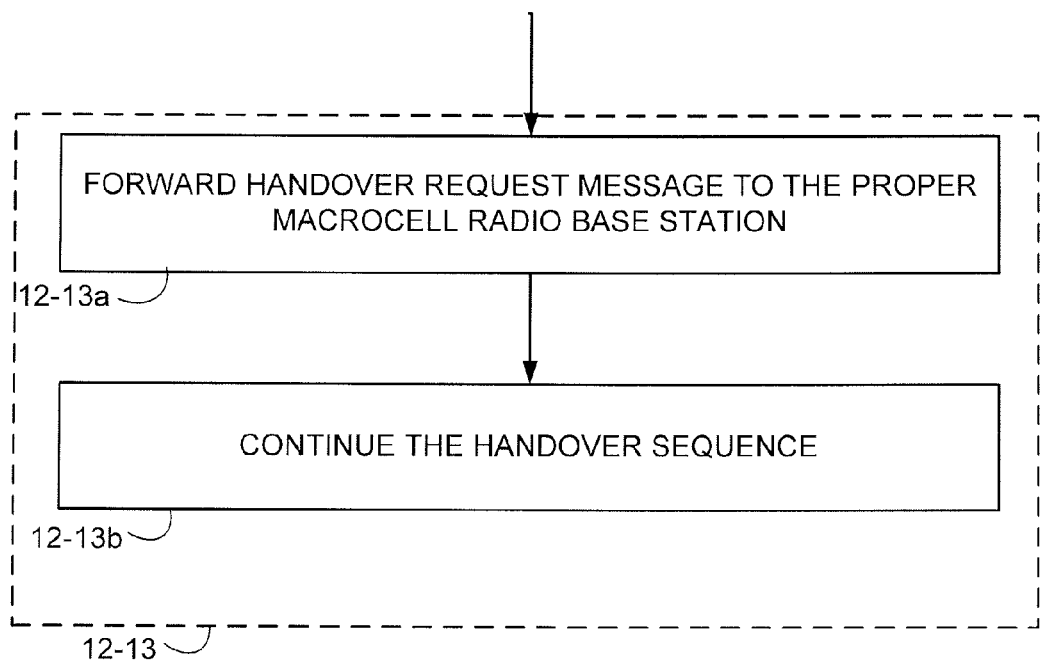

Act 12-5 can be performed as a case of "S1 initiated handover" (see subact 12-5a of FIG. 12A) or a case of "X2 initiated handover" (see subact 12-5b of FIG. 12A). Subact 12-5a comprises performing the handover sequence according to standardized S1 procedures. It is initiated by HeNB_31 sending the S1AP 'HANDOVER REQUIRED' message, including the target ECGI for MC_1.*m*, to the controlling MME via HeNB-GW_3.

Subact 12-5b comprises initiating the handover sequence according to standardized X1 procedures. As such, the HeNB_31 sends the X2AP 'HANDOVER REQUEST' message, including the target ECGI for MC_1.*m*, to HeNB-GW_3. It is to be noted that the X2 interface between HeNB_31 and HeNB-GW_3 is set up already at HeNB_31 commissioning.

Act 12-6 basically comprises the HeNB-GW_3 retrieving the IP address of the target eNB. Act 12-6 can be also performed as a case of "S1 initiated handover" or a case of "X2 initiated handover. In the case of "S1 initiated handover", the HeNB-GW_3 retrieves the IP address of the target eNB from eNB-ID_1 derived from the target ECGI in the S1AP 'HANDOVER REQUIRED' message. For the purpose of setup of the X2 interface, a HeNB-GW must sniff the S1AP 'HANDOVER REQUIRED' messages from HeNBs for ECGIs. In the case of "X2 initiated handover, the HeNB-GW_3 retrieves the IP address of the target eNB from eNB-ID_1 derived from the target ECGI in the X2AP 'HANDOVER REQUEST' message.

Act 12-7 comprises establishing an SCTP connection for the X2 interface between HeNB-GW_3 and eNB_1.

Act 12-8 comprises the femto radio base station gateway providing the abbreviated femtocell information to the macro radio base station. Specifically, as act 12-8 the HeNB-GW_3 sends the abbreviated femtocell information in a X2AP 'X2 SETUP REQUEST' message. In one example implementation and mode illustrated by symbol 4-1 of FIG. 4, the abbreviated femtocell information resides in a new information element and simply indicates the fact that HeNB-GW_3 serves femtocells, without specifying (i.e. identifying) any such particular served femtocell. In another example implementation and mode illustrated by symbol 4-2 of FIG. 4, the abbreviated femtocell information is information about the femtocells "served" by HeNB-GW_3 that are neighbors to the macrocells served by eNB_1. The cells are from the list for eNB_1. The proper eNB, i.e. eNB_1, is derived from the target E-UTRAN Cell Global Identity (ECGI) in the handover request. The Physical Cell Identity (PCI) and the E-UTRAN Cell Global Identity (ECGI) are also part of this information.

Act 12-9 comprises the eNB_1 storing the information on the "eNB" with eNB-ID_3 its abbreviated femtocell information.

Act 12-10 comprises the eNB_1 responding, with a X2AP 'X2 SETUP RESPONSE' message, with information on its served macrocells (MC_1.1 ... MC_1.*m*) to HeNB-GW_3. The Physical Cell Identity (PCI) and the E-UTRAN Cell Global Identity (ECGI) are part of this information.

Act 12-11 comprises the HeNB-GW_3 storing the information on the eNB with eNB-ID_1 and its served macrocells.

Act 12-12 comprises the HeNB-GW_3 updating, with X2AP 'ENB CONFIGURATION UPDATE' messages, its controlled HeNBs (HeNB_31 ... HeNB_39) that it is now an eNB proxy also for macrocells MC_1.1 to MC_1.*m*. In order to reduce the signaling, this update is sent only to those HeNBs whose latest Macrocell Surrounding Report includes at least one of the macrocells served by eNB_1. Only macrocells included in the Macrocell Surrounding Report may be included in the message in order to reduce the size of the message.

In the case of 'X2 initiated handover', the subacts comprising act 12-13 are performed. Subact 12-13a comprises the HeNB-GW_3 forwarding the X2AP 'HANDOVER REQUEST' message from HeNB_31 to the proper eNB, i.e. eNB_1, based on the eNB-ID derived from the target ECGI (eNB-ID_1) over the newly set up X2 interface. Subact 12-13b comprises continuing the handover sequence according to standardized X2 and S1 procedures for 'X2 initiated handover'.

Act 12-6, 12-7, 12-8, 12-9, 12-10, 12-11 are actually included in the X2 interface setup procedure. Act 12-12 is an update in order to maintain the X2 interface. The other acts are shown to clarify why and when X2 interface is set up and updated.

Figure 13:
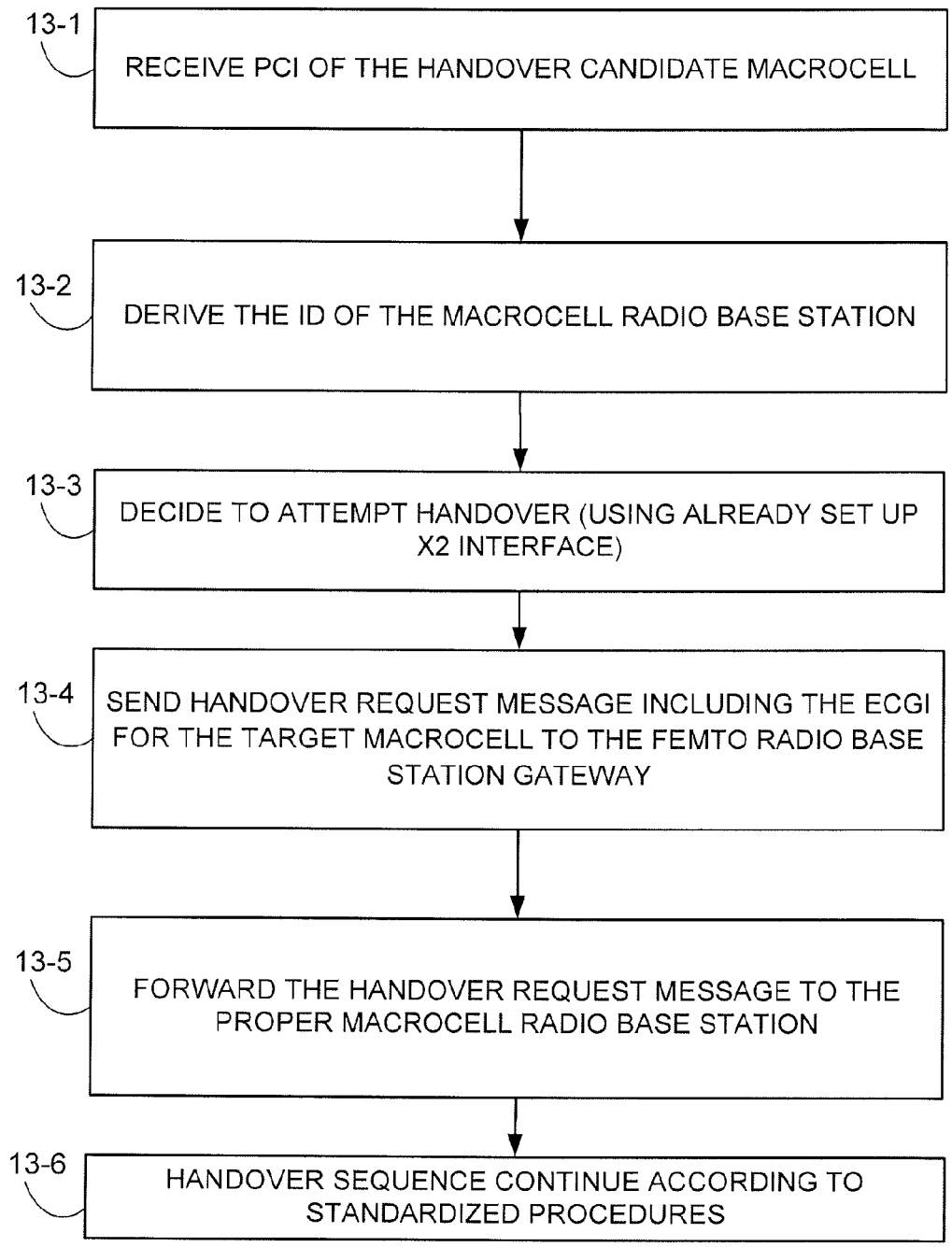
FIG. 13 is a flowchart illustrating basic, example, non-limiting acts or steps performed in a handover from a femtocell to a macrocell when an interface is already set up.

FIG. 13 illustrates example acts or steps performed in a handover from a femtocell to a macrocell when the X2 interface is already set up.

Act 13-1 comprises the HeNB (HeNB_31) receiving, from a user equipment unit in one of its femtocells (e.g. FC_31.*n*), the Physical Cell Identity (PCI) of the handover candidate macrocell (e.g. MC_1.*m*). As HeNB_31 has an X2 interface already set up all the way to the eNB that serves that cell (eNB_1), via HeNB-GW_3, the HeNB_31 has the relation between the received PCI and the corresponding E-UTRAN Cell Global Identity (ECGI). Besides, the HeNB_31 will recognize the PCI as being one for a macrocell and thus not subject to possible "PCI confusion". Therefore the HeNB_31 does not need to request the ECGI from the user equipment unit.

Act 13-2 comprises HeNB_31 deriving, from the ECGI for MC_1.*m*, the ID of the serving eNB. In this case it results in an eNB (eNB_1) and thus the handover candidate cell is a macrocell. As the controlling HeNB-GW (HeNB-GW_3) acts as eNB proxy for all eNBs, seen from HeNB_31, a handover request for a macrocell shall be sent to HeNB-GW_3.

Act 13-3 comprises the HeNB_31 deciding to attempt handover from FC_31.*n* to MC_1.*m*. The handover will be an 'X2 initiated handover'. For this example set up the X2 interface is used.

Act 13-4 comprises the HeNB_31 sending the X2AP 'HANDOVER REQUEST' message, including the target ECGI for MC_1.*m*, to HeNB-GW_3.

Act 13-5 comprises the HeNB-GW_3 forwarding the X2AP 'HANDOVER REQUEST' message from HeNB_31 to the proper eNB, i.e. eNB_1, based on the eNB-ID derived from the target ECGI (eNB-ID_1).

Act 13-6 comprises the handover sequence continuing according to standardized X2 and S1 procedures for 'X2 initiated handover'.

In the handover depicted by FIG. 13, no act or step is actually part of the X2 interface setup procedure. The acts of FIG. 13 are shown for clarification and to describe how the already set up X2 interface is used for 'X2 initiated handover'.

As explained above, the technology disclosed herein reduces the information, i.e. the number of cells, send from a femto radio base station gateway (i.e. a HeNB-GW, which functions as an eNB proxy) to a macro radio base station (i.e. eNB) at the setup of the X2 interface between the mentioned nodes, and accordingly also reduces the signaling load.

In one implementation and mode illustrated by symbol 4-1 of FIG. 4, in the interface setup process the concerned X2AP messages from the HeNB-GW only include an indication in that the HeNB-GW is "serving" femtocells without including any information about the femtocells. The concerned X2AP messages include the 'X2 SETUP REQUEST' and 'X2 SETUP RESPONSE'. These messages include the eNB identity of the HeNB-GW so a handover request from an eNB can be sent to the proper HeNB-GW. Thus, updates from the HeNB-GW when femtocells "come and go" are not needed. The receiving eNB can than take the information that the HeNB-GW is "serving" femtocells into account when preparing for handover into any of the "served" femtocells.

In another implementation and mode illustrated by symbol 4-2 of FIG. 4, the HeNB-GW maintains, for each known neighbor eNB, a list containing/specifying which of the HeNB-GW's "served" femtocells are neighbors to the macrocells served by the eNB. In the concerned X2AP messages, the HeNB-GW includes information only about those femtocells. The concerned X2AP messages again include the 'X2 SETUP REQUEST' and 'X2 SETUP RESPONSE'. These messages include the eNB identity of the HeNB-GW so a handover request from an eNB can be sent to the proper HeNB-GW. Accordingly, the needed number of cells in the concerned messages is substantially reduced (i.e. reduced from up to several tens of thousands to up to a few hundred). The present X2AP limit of 256 cells (maximum 256 neighbor femtocells to the macrocells served by an eNB) is most likely sufficient or at least it would be sufficient to increase it slightly e.g. to 512 cells. An update to a certain eNB is only needed when the corresponding list of the neighbor femtocells to the macrocells served by the eNB is changed.

The basic information for the mentioned lists of neighbor femtocells is obtained from the HeNBs, each of which includes a receiver (i.e. network listener 90) that listens for neighbor macrocells. A femtocell, served by a HeNB, is added to the lists of the eNBs, for which at least one macrocell is detected by the receiver.

As explained herein, with HeNBs in a network a concentrator node is introduce, herein also named the femto radio base station gateway or HeNB-GW. The HeNB-GW can be located or positioned to serve between many (tens of thousands) HeNBs and the core network. The HeNB-GW try to lessen the unacceptable signaling load that otherwise would fall upon the control nodes of the core network (the MMEs). For signaling between eNBs and HeNBs (the X2 interface) the same concern is valid. As an eNB may have several hundreds of real neighbor HeNBs, the signaling load on an eNB will be unacceptable without a HeNB-GW.

The technology disclosed herein facilitates a feasible architecture for an LTE Femtocell Solution with an X2 interface between the HeNBs and the eNBs, i.e. an architecture with HeNB-GWs. The technology disclosed herein overcomes many problems, including but not limited to:

Very large or many X2 interface setup messages
Frequent X2 interface updates
Requirements on eNBs to store information on many cells that are not real neighbors In an implementation and mode depicted by symbol 4-2 of FIG. 4, the eNBs will have information on the femtocells that are neighbor to its macrocells, thus facilitating coordination between these cells.

Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. In the appended claims which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed hereby. Moreover, it is not necessary for a device or method to address each and every problem sought to be solved by the present invention for it to be encompassed hereby.

What is claimed is:

1. A method of operating a radio access network, the method comprising:
   determining that an interface needs to be established between a femto radio base station gateway and a macro radio base station; and
   establishing said interface by including abbreviated femtocell information in a message of an interface setup procedure sent between the femto radio base station gateway and the macro radio base station:
   wherein said interface is established as an interface between radio base stations, such that the femto radio base station gateway appears to the macro radio base station as another radio base station, and wherein the femto radio base station gateway also establishes:
      an interface to a femto radio base station, wherein the interface to the femto radio base station is established as an interface between a radio base station and a core network in order to appear to the femto radio base station as a core network; and an interface to the core network, wherein the interface to the core network is established as an interface between a radio base station and a core network in order to appear to the core network as a radio base station.

2. The method of claim 1, wherein the abbreviated femtocell information specifies that the femto radio base station gateway serves a femtocell without identifying any particular femtocell.

3. The method of claim 1, wherein the abbreviated femtocell information specifies identities of femtocells which are served by the femto radio base station gateway and which also neighbor a macrocell served by the macro radio base station, without identifying any other femtocells.

4. The method of claim 1, wherein determining that an interface needs to be established between the femto radio base station gateway and the macro radio base station comprises determining that the interface needs to be established responsive to at least one of:

establishing an interface between an femto radio base station and the femto radio base station gateway;

the macro radio base station attempting to handover a user equipment unit from a macrocell served by the macro radio base station to a femtocell served by the femto radio base station;

the femto radio base station attempting to handover a user equipment unit from a femtocell served by the femto radio base station to a macrocell served by the macro radio base station.

5. The method of claim 1, further comprising including in the message of the interface setup procedure an identifier of the macro radio base station and the femto radio base station gateway.

6. The method of claim 1, further comprising:

receiving a macrocell surrounding report from a femto radio base station upon start up of that femto radio base station; and after receiving the macrocell surrounding report, establishing an interface between the femto radio base station and the femto radio base station gateway.

7. The method of claim 1, further comprising establishing an interface between a femto radio base station and the femto radio base station gateway by:

establishing a connection between the femto radio base station and the femto radio base station gateway;

receiving from the femto radio base station information concerning the femtocells served by the femto radio base station; and providing the femto radio base station with information regarding known neighbor macrocells identified by the femto radio base station in a macrocell surrounding report.

8. The method of claim 1, wherein establishing the interface between the femto radio base station gateway and the macro radio base station further comprises:

retrieving an address of the macro radio base station, wherein the macro radio base station serves a macrocell included in a macrocell surrounding report obtained from a femto radio base station;

establishing a connection between the femto radio base station gateway and the macro radio base station;

sending to the macro radio base station an interface setup request message that includes therein the abbreviated femtocell information; and receiving from the macro radio base station an interface setup response message that includes therein information about the macrocells served by the macro radio base station.

9. The method of claim 1, wherein said establishing comprises:

establishing a connection between the macro radio base station and the femto radio base station gateway;

receiving from the macro radio base station, in another message of the interface setup procedure, information on macrocells served by the macro radio base station ;

storing the information on the macrocells served by the macro radio base station; and providing the abbreviated femtocell information to the macro radio base station;

wherein the method further comprises notifying each of one or more femto radio base stations served by the femto radio base station gateway that the femto radio base station gateway now serves as a proxy for one or more macrocells served by the macro radio base station, if at least one of those macrocells is included in a macrocell surrounding report generated by that femto radio base station.

10. The method of claim 1, wherein said determining comprises receiving from a femto radio base station served by the femto radio base station gateway a handover request message that includes an unambiguous identifier of a handover candidate macrocell, wherein said establishing comprises deriving from the unambiguous identifier of the handover candidate macrocell an identifier of said macro radio base station, said macro radio base station serving the handover candidate macrocell, retrieving an address for the macro radio base station from the identifier of the macro radio base station, establishing a connection between the femto radio base station gateway and the macro radio base station, providing the abbreviated femtocell information to the macro radio base station, and receiving from the macro radio base station macrocell information concerning macrocells served by that macro radio base station, and wherein the method further comprises notifying each of one or more femto radio base stations served by the femto radio base station gateway that the femto radio base station gateway now serves as a proxy for one or more macrocells served by the macro radio base station, if at least one of those macrocells is included in a macrocell surrounding report generated by that femto radio base station.

11. The method of claim 1, wherein said abbreviated femtocell information concerns information about no more than a distinct minority of femtocells served by the femto radio base station gateway.

12. A femto radio base station gateway comprising:

a memory configured to store a directory of femto radio base stations served by the femto radio base station gateway and of femtocells served by those femto radio base stations; and an interface manager configured to establish:

an interface between the femto radio base station gateway and a macro radio base station using an interface setup procedure, and, when establishing that interface, to include abbreviated femtocell information in a message of the interface setup procedure sent between the femto radio base station gateway and the macro radio base station, wherein said interface is established as an interface between radio base stations, such that the femto radio base station gateway appears to the macro radio base station as another radio base station;

an interface to a femto radio base station, wherein the interface to the femto radio base station is established as an interface between a radio base station and a core network in order to appear to the femto radio base station as a core network; and an interface to the core network, wherein the interface to the core network is established as an interface between a radio base station and a core network in order to appear to the core network as a radio base station.

13. The femto radio base station gateway of claim 12, wherein the abbreviated femtocell information specifies that the femto radio base station gateway serves a femtocell without identifying any particular femtocell.

14. The femto radio base station gateway of claim 12, wherein the abbreviated femtocell information specifies identities of femtocells which are served by the femto radio base station gateway and which also neighbor a macrocell served by the macro radio base station without identifying any other femtocells.

15. The femto radio base station gateway of claim 12, wherein said abbreviated femtocell information concerns information about no more than a distinct minority of femtocells served by the femto radio base station gateway.

16. A telecommunications system comprising:
a macro radio base station configured to serve at least one macrocell of a radio access network;
a femto radio base station configured to serve at least one femtocell of the radio access network;
a femto radio base station gateway which serves the femto radio base station, wherein the femto radio base station gateway comprises an interface manager configured to establish:
an interface between the femto radio base station gateway and the macro radio base station using an interface setup procedure, and, when establishing that interface, to include abbreviated femtocell information in a message of the interface setup procedure sent between the femto radio base station gateway and the macro radio base station, wherein said interface is established as an interface between radio base stations, such that the femto radio base station gateway appears to the macro radio base station as another radio base station;
an interface to a femto radio base station, wherein the interface to the femto radio base station is established as an interface between a radio base station and a core network in order to appear to the femto radio base station as a core network; and
an interface to the core network, wherein the interface to the core network is established as an interface between a radio base station and a core network in order to appear to the core network as a radio base station.

17. The system of claim 16, wherein the abbreviated femtocell information specifies that the femto radio base station gateway serves a femtocell without identifying any particular femtocell.

18. The system of claim 16, wherein the abbreviated femtocell information specifies identities of femtocells which are served by the femto radio base station gateway and which also neighbor a macrocell served by the macro radio base station without identifying any other femtocells.

19. The system of claim 16, wherein said abbreviated femtocell information concerns information about no more than a distinct minority of femtocells served by the femto radio base station gateway.

20. A method implemented by a femto radio base station, comprising:
upon startup of the femto radio base station, sending a macrocell surrounding report to a femto radio base station gateway that serves the femto radio base station, wherein the macrocell surrounding report identifies known macrocells that neighbor the femto radio base station, and
after sending the macrocell surrounding report, establishing an interface between the femto radio base station and the femto radio base station gateway, wherein the interface is established as an interface between a radio base station and a core network such that the femto radio base station perceives the femto radio base station gateway as a core network, wherein the femto radio base station gateway is a gateway that is configured to also establish:
an interface to a macro radio base station as an interface between radio base stations, such that the femto radio base station gateway appears to a macro radio base station as another radio base station; and
an interface to the core network, wherein the interface to the core network is established as an interface between a radio base station and a core network in order to appear to the core network as a radio base station.

21. The method of claim 20, further comprising sending to the femto radio base station gateway information concerning femtocells served by the femto radio base station, and receiving from the femto radio base station gateway information regarding the known macrocells identified by the femto radio base station in the macrocell surrounding report.

22. The method of claim 20, further comprising:
obtaining a possibly ambiguous identifier of a handover candidate macrocell from a user equipment unit in a femtocell served by the femto radio base station;
obtaining an unambiguous identifier of the handover candidate macrocell from the user equipment unit;
deriving from the unambiguous identifier an identifier of the macro radio base station that serves the handover candidate macrocell; and
attempting to handover to the handover candidate macrocell by sending to the femto radio base station gateway a handover request message that includes the unambiguous identifier of the handover candidate macrocell.

23. A method implemented by a macro radio base station, comprising:
obtaining a possibly ambiguous identifier of a handover candidate femtocell from a user equipment unit in a macrocell served by the macro radio base station;
obtaining an unambiguous identifier of the handover candidate femtocell from the user equipment unit;
deriving from the unambiguous identifier an identifier of a femto radio base station gateway for the handover candidate femtocell;
establishing a connection between the macro radio base station and the femto radio base station gateway;
sending information on macrocells served by the macro radio base station to the femto radio base station gateway in a message of an interface setup procedure for setting up an interface between the macro radio base station and the femto radio base station gateway;
receiving abbreviated femtocell information from the femto radio base station gateway in another message of the interface setup procedure; and
storing the abbreviated femtocell information,
wherein said interface is established as an interface between radio base stations, such that the femto radio base station gateway appears to the macro radio base station as another radio base station.

24. The method of claim 1, wherein the interface between the femto radio base station gateway and the macro radio base station comprises an X2 interface, and wherein the interfaces to the femto radio base station and to the core network both comprise an S1 interface.

25. The femto radio base station gateway of claim 12, wherein the interface between the femto radio base station gateway and the macro radio base station comprises an X2 interface, and wherein the interfaces to the femto radio base station and to the core network both comprise an S1 interface.

26. The method of claim 20, wherein the interface comprises an S1 interface.

27. The method of claim 23, wherein the interface comprises an X2 interface.

* * * * *